(12) United States Patent
Takahashi

(10) Patent No.: US 10,390,047 B2
(45) Date of Patent: Aug. 20, 2019

(54) IMAGE PROCESSING APPARATUS AND IMAGE PROCESSING METHOD FOR CONTROLLING THE GRANULARITY IN TRICK PLAY

(71) Applicant: SONY CORPORATION, Tokyo (JP)

(72) Inventor: Ryohei Takahashi, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/108,818

(22) PCT Filed: Dec. 25, 2015

(86) PCT No.: PCT/JP2015/086202
§ 371 (c)(1),
(2) Date: Jun. 29, 2016

(87) PCT Pub. No.: WO2016/111199
PCT Pub. Date: Jul. 14, 2016

(65) Prior Publication Data
US 2017/0302964 A1   Oct. 19, 2017

(30) Foreign Application Priority Data
Jan. 9, 2015   (JP) ................................. 2015-002890

(51) Int. Cl.
*H04N 11/02*   (2006.01)
*H04N 19/70*   (2014.01)
(Continued)

(52) U.S. Cl.
CPC .............. *H04N 19/70* (2014.11); *H04N 19/30* (2014.11); *H04N 19/44* (2014.11); *H04N 19/46* (2014.11)

(58) Field of Classification Search
CPC ........................................................ H04N 19/70
(Continued)

(56) References Cited

U.S. PATENT DOCUMENTS

2008/0117988 A1* 5/2008 Toma .................... G11B 27/005
375/240.26
2009/0016447 A1   1/2009 Chen et al.
(Continued)

FOREIGN PATENT DOCUMENTS

CN   101390400 A   3/2009
EP     1827023 A1   8/2007
(Continued)

OTHER PUBLICATIONS

Jill Boyce et al., "Extensible High Layer Syntax for Scalability", Input Document to JCT-VC, Joint Collaborative Team on Video Coding (JCT-VC) of ITU-T SG16 WP3 and ISO/IEC JTC1/SC29/WG11, 5th Meeting: Geneva, CH, Mar. 16-23, 2011, pp. 10.
(Continued)

*Primary Examiner* — Leron Beck
(74) *Attorney, Agent, or Firm* — Chip Law Group

(57) ABSTRACT

The present invention relates to an image processing apparatus and an image processing method that allow for setting information allowing for easily controlling the granularity in trick play. A setting unit sets Supplemental Enhancement Information (SEI) about the encoded data of pictures. The SEI includes the reference layer information indicating layers of the reference relationship among the pictures. The present invention can be used, for example, for a recording device that encodes the video data in a High Efficiency Video Coding (HEVC) scheme in the Blu-ray (registered trademark) Disc (BD) standard.

17 Claims, 15 Drawing Sheets

(51) Int. Cl.
*H04N 19/30* (2014.01)
*H04N 19/44* (2014.01)
*H04N 19/46* (2014.01)

(58) Field of Classification Search
USPC .................................. 375/240.01–240.29
See application file for complete search history.

(56) References Cited

U.S. PATENT DOCUMENTS

| | | | |
|---|---|---|---|
| 2010/0260268 A1* | 10/2010 | Cowan | H04N 13/0048 375/240.25 |
| 2011/0164112 A1* | 7/2011 | Husak | H04N 13/0048 348/43 |
| 2011/0211634 A1* | 9/2011 | Goedeken | H04N 21/23412 375/240.02 |
| 2011/0216837 A1* | 9/2011 | Luo | H04N 19/00 375/240.25 |
| 2012/0023249 A1* | 1/2012 | Chen | H04N 21/235 709/231 |
| 2012/0120200 A1* | 5/2012 | Newton | H04N 13/0003 348/46 |
| 2013/0271571 A1* | 10/2013 | Wu | H04N 13/0048 348/43 |
| 2013/0308926 A1* | 11/2013 | Jang | H04N 5/783 386/344 |
| 2014/0079116 A1* | 3/2014 | Wang | H04N 19/597 375/240.02 |
| 2014/0254669 A1* | 9/2014 | Rapaka | H04N 19/50 375/240.12 |
| 2016/0323609 A1* | 11/2016 | Yoon | H04N 21/2387 |

FOREIGN PATENT DOCUMENTS

| | | |
|---|---|---|
| EP | 1989884 A1 | 11/2008 |
| JP | 2009-528715 A | 8/2009 |
| JP | 5227193 B2 | 7/2013 |
| JP | 2013-158003 A | 8/2013 |
| WO | 2006/003814 A | 1/2006 |
| WO | 2007/096288 A1 | 8/2007 |
| WO | 2012/096806 A | 7/2012 |

OTHER PUBLICATIONS

Miska M. Hannuksela et al., "Indication of the Temporal Structure of Coded Video Sequences", Input Document to JCT-VC, Joint Collaborative Team on Video Coding (JCT-VC) of ITU-T SG16 WP3 and ISO/IEC JTC1/SC29/WG11, 8th Meeting: San Jose, CA, USA, Feb. 1-10, 2012, pp. 5.

Jill Boyce et al., "High Layer Syntax to Improve Support for Temporal Scalability", Input Document to JCT-VC, Joint Collaborative Team on Video Coding (JCT-VC) of ITU-T SG16 WP3 and ISO/IEC JTC1/SC29/WG11, 4th Meeting: Daegu, KR, Jan. 20-28, 2011, pp. 14.

Jill Boyce et al., "High Layer Syntax to Improve Support for Temporal Scalability", Joint Collaborative Team on Video Coding (JCT-VC) of ITU-T SG16 WP3 and ISO/IEC JTC1/SC29/WG11, 4th Meeting: Daegu, KR, Jan. 20-28, 2011, pp. 14.

Miska M. Hannuksela et al., "Indication of the temporal Structure of coded video sequences", Joint Collaborative Team on Video Coding (JCT-VC) of ITU-T SG16 WP3 and ISO/IEC JTC1/SC29/WG11, 8th Meeting: San Jose, CA, US, Feb. 1-10, 2012, pp. 14.

Jill Boyce et al., "Extensible High Layer Syntax for Scalability", Joint Collaborative Team on Video Coding (JCT-VC) of ITU-T SG16 WP3 and ISO/IEC JTC1/SC29/WG11, 5th Meeting: Geneva, CH, Mar. 16-23, 2011, pp. 10.

Boyce, et al., "High Layer Syntax to Improve Support for Temporal Scalability", Joint Collaborative Team on Video Coding (JCT-VC) of ITU-T SG16 WP3 and ISO/IEC JTC1/SC29/WG11, 4th Meeting, Daegu, KR, Jan. 20-28, 2011 14 pages.

Hannuksela, et al., "Indication of the temporal structure of coded video sequences", Joint Collaborative Team on Video Coding (JCT-VC) of ITU-T SG16 WP3 and ISO/IEC JTC1/SC29/WG11, 8th Meeting, San Jose, CA, USA, Feb. 1-10, 2012, 09 pages.

Extended European Search Report of EP Application No. 15874421.9, dated May 22, 2018, 10 pages of EESR.

Office Action for EP Patent Application No. 15874421.9, dated Apr. 10, 2019, 07 pages of Office Action.

"AVC Video Systems and Transport Constraints for Cable Television", Society of Cable Telecommunications Engineers, ANSI/SCTE 128 2010-a, pp. 1-42.

* cited by examiner

FIG. 5

| Syntax | No. of bits | Mnemonic |
|---|---|---|
| GOP_structure_map () { | | |
| number_of_pictures_in_GOP | 16 | uimsbf |
| for (i=0; i<number_of_pictures_in_GOP; i++) { // decoding order | | |
| shifting_bits | 5 | uimsbf |
| picture_structure | 3 | uimsbf |
| reserved_for_future_use | 1 | |
| temporal_id | 3 | uimsbf |
| picture_type | 4 | uimsbf |
| } | | |

IMAGE PROCESSING APPARATUS AND IMAGE PROCESSING METHOD FOR CONTROLLING THE GRANULARITY IN TRICK PLAY

CROSS REFERENCE TO RELATED APPLICATIONS

This application is a U.S. National Phase of International Patent Application No. PCT/JP2015/086202 filed on Dec. 25, 2015, which claims priority benefit of Japanese Patent Application No. JP 2015-002890 filed in the Japan Patent Office on Jan. 9, 2015. Each of the above-referenced applications is hereby incorporated herein by reference in its entirety.

TECHNICAL FIELD

The present invention relates to an image processing apparatus, an image processing method, a program, and a recording medium. In particular, the present invention relates to an image processing apparatus, an image processing method, and a program, and a recording medium that allow for easily controlling the granularity in trick play.

BACKGROUND ART

Advanced Video Coding (AVC) schemes are used as a scheme for encoding a video in the current Blu-ray (registered trademark) Disc (BD) standard (see Patent Document 1). In the AVC scheme in the BD standard, a GOP structure map that describes information of all the pictures included in a Group of Picture (GOP) can be stored as the user unregistered Supplemental Enhancement Information (SEI) of an Elementary Stream (ES).

When the GOP structure map is stored as the SEI of the ES, the reproducing device can easily perform trick play such as fast-forward reproducing or rewind reproducing, using the GOP structure map. For example, the reproducing device can easily perform the fast-forward reproducing or rewind reproducing by recognizing I pictures in the GOP in accordance with the type of each picture included in the GOP, the type is described in the GOP structure map, and parsing only the I pictures.

On the other hand, the Blu-ray (registered trademark) Disc Association (BDA) has discussed establishment of the standard for the next-generation BD. The BDA plans to newly adopt a High Efficiency Video Coding (HEVC) scheme as the video coding scheme in the next-generation BD standard.

CITATION LIST

Patent Document

Patent Document 1: Japanese Patent Application Laid-Open No. 2013-158003.

SUMMARY OF THE INVENTION

Problems to be Solved by the Invention

The discussion, however, does not include that the information allowing for easily controlling the granularity in trick play is set in the ES. Thus, it is difficult to allow for easily controlling the granularity in trick play.

In light of the foregoing, the present invention allows for easily controlling the granularity in trick play.

Solutions to Problems

An image processing apparatus according to a first aspect of the present invention includes: a setting unit that sets additional information about encoded data of pictures, the additional information including reference layer information indicating layers of a reference relationship among the pictures.

The image processing method and program according to the first aspect of the present invention correspond to the image processing apparatus according to the first aspect of the present invention.

According to the first aspect of the present invention, the additional information about the encoded data of pictures is set. The additional information includes the reference layer information indicating layers of the reference relationship among the pictures.

An image processing apparatus according to a second aspect of the present invention includes: a selection unit that selects a picture to be reproduced in accordance with reference layer information indicating layers of a reference relationship among pictures, the reference layer information being included in additional information about encoded data of the pictures.

The image processing method and program according to the second aspect of the present invention correspond to the image processing apparatus according to the second aspect of the present invention.

According to the second aspect of the present invention, a picture to be reproduced is selected in accordance with the reference layer information indicating the layers of the reference relationship among the pictures. The reference layer information is included in the additional information about the encoded data of the pictures.

A recording medium according to a third aspect of the present invention is attached to an information processing apparatus and reproduced, on which an encoded stream including additional information about encoded data of pictures and the encoded data is recorded, the additional information including reference layer information indicating layers of a reference relationship among the pictures, the recording medium causes an information processing apparatus acquiring the encoded stream to select a picture to be reproduced in accordance with the reference layer information included in the additional information.

According to the third aspect of the present invention, the encoded stream including the additional information about the encoded data of pictures and the encoded data is recorded on the recording medium. The additional information includes the reference layer information indicating the layers of the reference relationship among the pictures. Then, the recording medium is attached to the information processing apparatus and reproduced.

Effects of the Invention

According to the first aspect of the present invention, the information allowing for easily controlling the granularity in trick play can be set.

According to the second aspect of the present invention, the granularity in trick play can easily be controlled.

The effects of the present invention are not necessarily limited to the effects described above, and may be one of the effects described herein.

BRIEF DESCRIPTION OF DRAWINGS

FIG. 5 is a diagram of an exemplary syntax of a GOP structure map.

MODE FOR CARRYING OUT THE INVENTION

The modes for carrying out the present invention (hereinafter, referred to as embodiments) will be described hereinafter. Note that the embodiments will be described in the following order.
1. First Embodiment: Recording/Reproducing System (FIGS. 1 to 14)
2. Second Embodiment: Computer (FIG. 15)

First Embodiment (Exemplary Configuration of Embodiment of Recording/Reproducing System)

Figure 1:
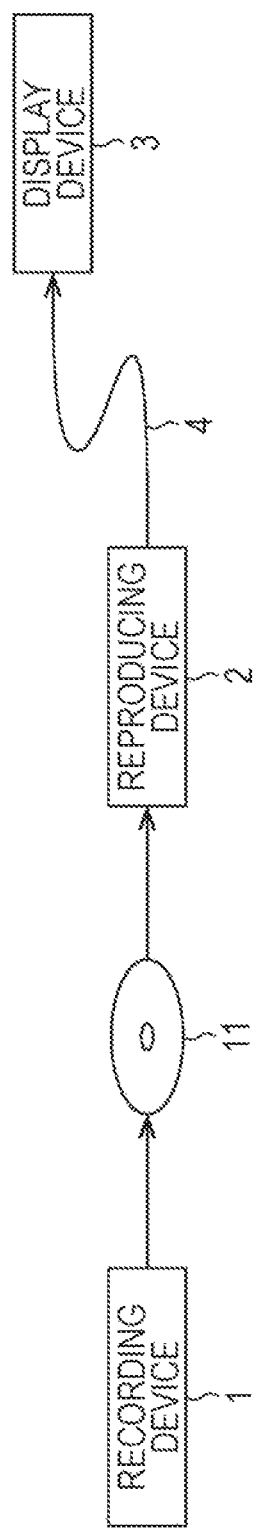
FIG. 1 is a block diagram of an exemplary configuration of an embodiment of a recording/reproducing system using the present invention.

FIG. 1 is a block diagram of an exemplary configuration of an embodiment of the recording/reproducing system using the present invention.

The recording/reproducing system illustrated in FIG. 1 includes a recording device 1, a reproducing device 2, and a display device 3. The reproducing device 2 is connected to the display device 3 via a High Definition Multimedia Interface (HDMI) (registered trademark) cable 4. The reproducing device 2 may be connected to the display device 3 via a cable in another standard, or via wireless communications.

The recording device 1 records the contents, for example, of a video or voice. The reproducing device 2 reproduces the contents. The contents are provided from the recording device 1 to the reproducing device 2 with an optical disk 11 (a recording medium) attached to the recording device 1 and the reproducing device 2 (an information processing apparatus). In this example, the optical disk 11 is a disk on which the contents are recorded in a format equivalent to the BD-ROM (Read Only Memory) format. Thus, the recording device 1 is used, for example, by the author of the contents.

The optical disk 11 may also be a disk on which the contents are recorded in a format equivalent to another format such as BD-R, or BD-RE. The contents may be provided from the recording device 1 to the reproducing device 2 with a removable medium other than the optical disk, such as a memory card equipped with a flash memory.

It is properly assumed hereinafter that the recording device 1 records the contents on the optical disk 11, and then the optical disk 11 is provided to the reproducing device 2. Actually, however, optical disks are replicated based on the master disk on which the recording device 1 records the contents, and then the optical disk 11 that is one of the replicated optical disks is provided to the reproducing device 2.

For example, video data and voice data is recorded on the recording device 1 (the image processing apparatus). The recording device 1 generates ES by encoding the data, and generates an AV stream that is a Transport Stream (TS) by multiplexing the data. The recording device 1 records, for example, the generated AV stream on the optical disk 11.

The reproducing device 2 (the image processing apparatus) drives a drive to read the AV stream recorded on the optical disk 11. The reproducing device 2 decodes the AV stream by separating the AV stream into a video stream that is the ES of the video data and a voice stream that is the ES of the voice data. The reproducing device 2 outputs the decoded video data and voice data to the display device 3.

The display device 3 receives the video data transmitted from the reproducing device 2 to display the video based on the video data on a built-in monitor. The display device 3 receives the voice data transmitted from the reproducing device 2 to output the voice based on the voice data from a built-in loudspeaker.

(Directory Structure on Optical Disk)

Figure 2:
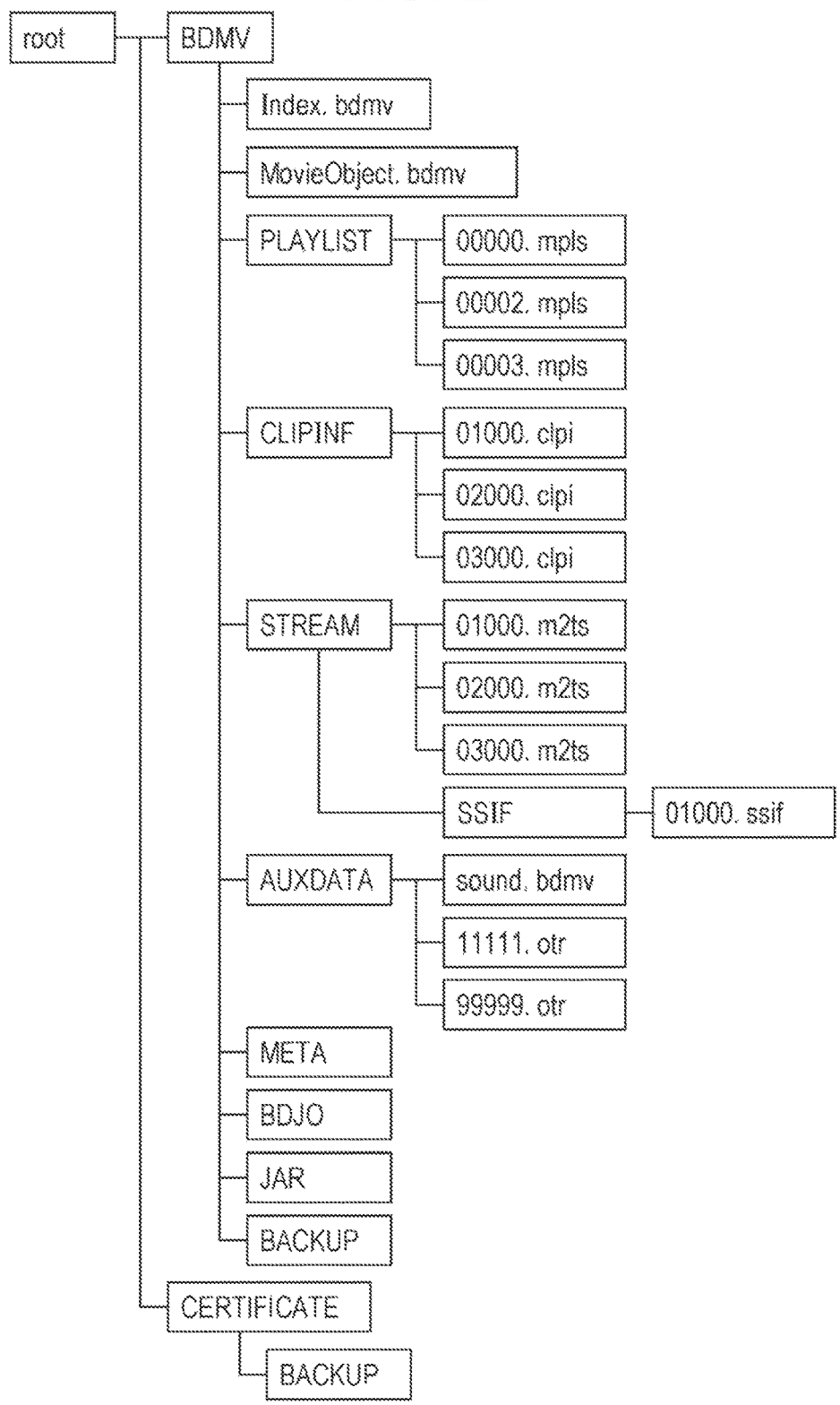
FIG. 2 is a diagram of an exemplary directory structure of files recorded in an optical disk.

FIG. 2 illustrates an exemplary directory structure of the files recorded on the optical disk 11 illustrated in FIG. 1.

The files recorded on the optical disk 11 are hierarchically managed in a directory structure. A root directory is created on the optical disk 11.

A BDMV directory is placed under the root directory.

An Index file named "Index.bdmv" and a Movie Object file named "MovieObject.bdmv" are stored under the BDMV directory.

In the Index file, for example, the list of the numbers of titles recorded on the optical disk 11 and the types and numbers of objects executed corresponding the number of the title are described. The types of objects include two types: a Movie Object; and a BD-J Object.

The Movie Object is an object in which a navigation command used, for example, to reproduce a Playlist is described. The BD-J Object is an object in which a BD-J application is described. The Movie Object is described in a Movie Object file.

For example, a PLAYLIST directory, a CLIPINF directory, and a STREAM directory are provided under the BDMV directory.

The PLAYLIST directory stores Playlist files in which a Playlist to be used as the reproducing management information used to manage the reproducing of the AV stream is described. A name that is a combination of a five-digit number and an extension ".mpls" is set on each Playlist file. The three Playlist files illustrated in FIG. 2 are named "00000. mpls", "00002. mpls", and "00003. mpls", respectively.

The CLIPINF directory stores the information about the AV stream in predetermined units as Clip Information files. A name that is a combination of a five-digit number and an extension ".clpi" is set on each Clip Information file. The three Clip Information files illustrated in FIG. 2 are named "01000.clpi", "02000.clpi", and "03000.clpi", respectively.

The STREAM directory stores the AV stream in predetermined units as stream files. A name that is a combination of a five-digit number and an extension ".m2ts" is set on each stream file. The three stream files illustrated in FIG. 2 are named "01000.m2ts", "02000.m2ts", and "03000.m2ts", respectively.

The Clip Information file and stream file that have the same five-digit number in their file names form a Clip. To reproduce the stream file "01000.m2ts", the Clip Information file "01000.clpi" is used. To reproduce the stream file "02000.m2ts", the Clip Information file "02000.clpi" is used.

(Exemplary Configuration of File Generation Unit)

Figure 3:
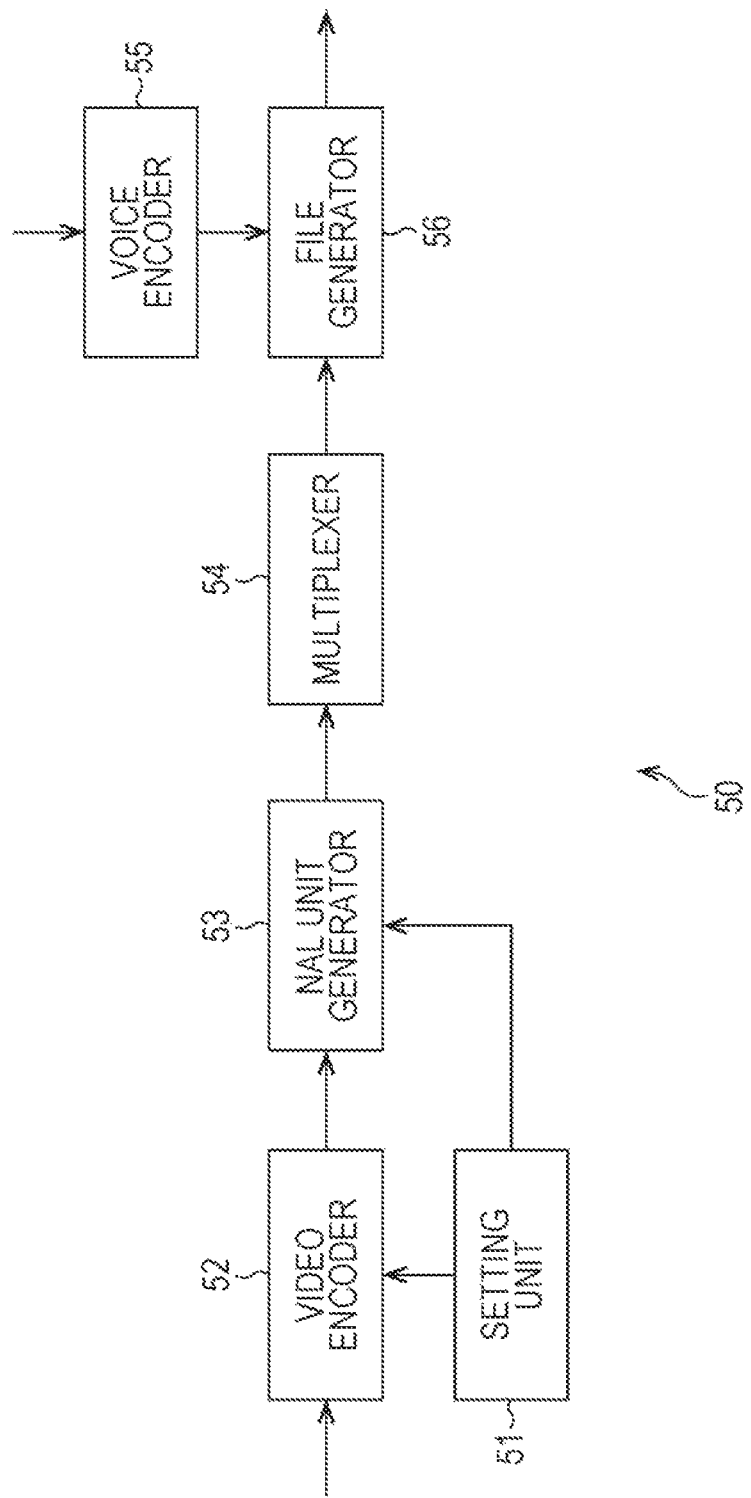
FIG. 3 is a block diagram of an exemplary configuration of a file generation unit.

FIG. 3 is a block diagram of an exemplary configuration of the file generation unit of the recording device 1 in FIG. 1, which generates a stream file.

A file generation unit 50 in FIG. 3 includes a setting unit 51, a video encoder 52, a Network Abstraction Layer (NAL) unit generator 53, a multiplexer 54, a voice encoder 55, and a file generator 56.

The setting unit 51 of the file generation unit 50 sets parameter sets including a Sequence Parameter Set (SPS), a Picture Parameter Set (PPS), and the additional information (SEI). A piece of SEI in a picture at the beginning of a GOP (hereinafter, referred to as the first picture) stores a GOP structure map including the reference layer information that is numbers of layers (sub-layers) of the reference relationship among all the pictures including the first picture and included in the GOP. The setting unit 51 provides the set parameter sets to the video encoder 52 and the NAL unit generator 53.

The video data is input by the picture to the video encoder 52. The video encoder 52 encodes each picture of the input video data in the Coding Unit (CU) in the HEVC scheme. In the encoding, the parameter set provided from the setting unit 51 is used as necessary. The video encoder 52 provides the encoded data of each encoded picture in units of slices to the NAL unit generator 53.

The NAL unit generator 53 organizes the parameter sets provided from the setting unit 51 and the encoded data provided from the video encoder 52 into NAL units and generates NAL units including a NAL header and a data part. The NAL unit generator 53 provides the generated NAL units to the multiplexer 54.

The multiplexer 54 generates an Access Unit (AU) by putting together the NAL units provided from the NAL unit generator 53 by the picture. The multiplexer 54 provides a video stream including one or more AUs to the file generator 56.

The voice data is input to the voice encoder 55. The voice encoder 55 encodes the voice data and provides the voice stream generated by the encoding to the file generator 56.

The file generator 56 generates an AV stream by multiplexing the video stream (encoded stream) provided from the multiplexer 54 and the voice stream provided from the voice encoder 55. The file generator 56 generates a stream file by saving the generated AV stream as a file, and outputs the stream file. The stream file is recorded on the optical disk 11.

(Exemplary Structure of Au of First Picture)

Figure 4:
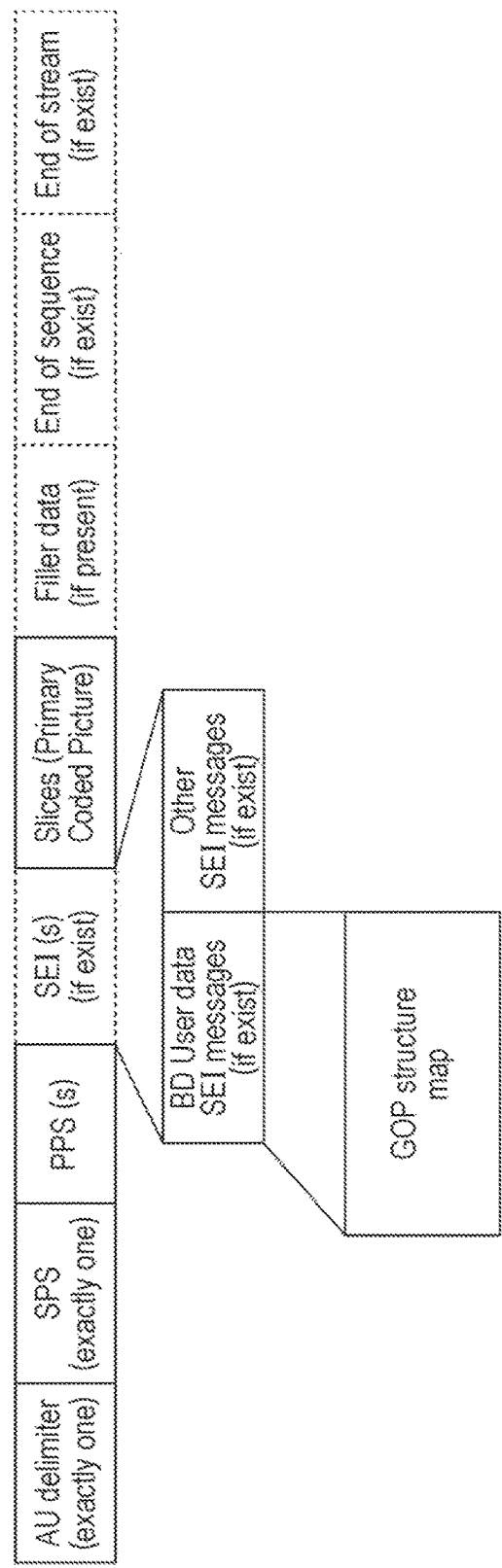
FIG. 4 is an exemplary structure of an AU of a first picture.

FIG. 4 illustrates an exemplary structure of AU of the first picture.

As illustrated in FIG. 4, an AU delimiter indicating the boundary between the AUs is placed at the beginning of the AU of the first picture. Subsequently, an SPS NAL unit, one or more PPS NAL units, one or more SEI NAL units and one or more NAL units of the encoded data in units of slices are placed in order. After that, filer data is placed as necessary. When the first picture is the last picture of a sequence, "End of sequence" indicating the end of the sequence is placed. When the first picture is the last picture of the video stream, "End of stream" indicating the end of the video stream is placed.

The SEI NAL units store a GOP structure map including the reference layer information.

(Exemplary Syntax of GOP Structure Map)

FIG. 5 is a diagram of exemplary Syntax of the GOP structure map.

As illustrated in FIG. 5, the GOP structure map describes "number_of_pictures_in_GOP" that is the number of pictures of the corresponding GOP. The GOP structure map describes a five-bit "shifting_bits (stuffing_bits)" on which one is set, and "picture_structure", "temporal_id", and "picture_type" of the picture on each picture of the corresponding GOP.

The "picture_structure" is a three-bit value indicating the frame structure when the picture is displayed. The "picture_structure" indicates whether the picture is displayed at the same frame rate as the frame rate of the video stream or at the frame rate twice or three times faster than the frame rate of the video stream.

The "temporal_id" is a three-bit value found by subtracting one from the "nuh_temporal_id_plus1" indicating the reference layer information about the picture and included in the NAL header of the encoded data of the picture. The reference layer information is not used in the AVC scheme in the BD standard, and is used in the Scalable Video Coding Extension (SVC) scheme or the HEVC scheme.

The "picture_type" (picture type information) is a four-bit value indicating the type of the picture. For example, when the type of the picture is an I picture, the value is 1000b. When the type of the picture is a reference B picture, the value is 1010b. When the type of the picture is a non-reference B picture, the value is 0010b. When the type of the picture is a P picture, the value is 1001b.

(Description of Reference Layer Information)

Figure 6:
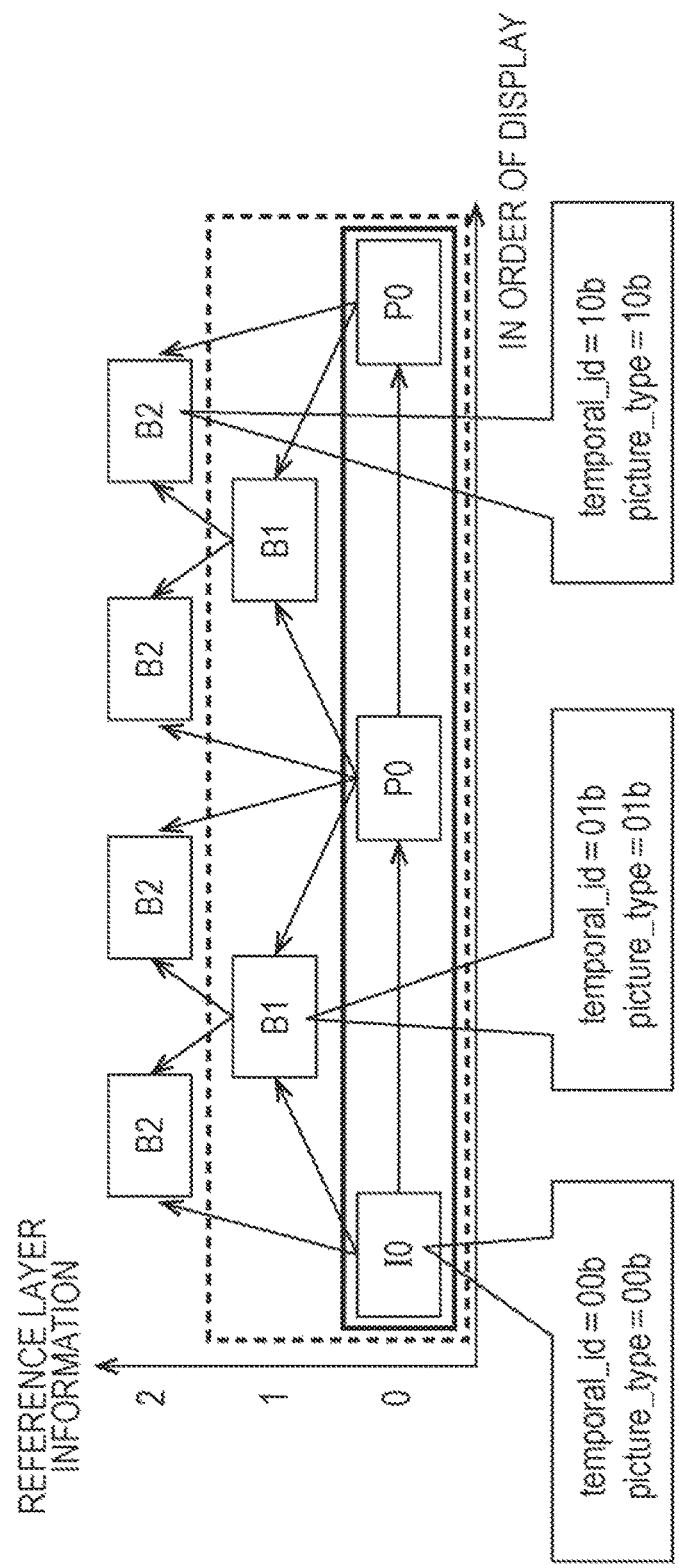
FIG. 6 is an explanatory diagram of reference layer information.

FIG. 6 is an explanatory diagram of the reference layer information.

Note that there are three layers of the reference relationship in the example illustrated in FIG. 6. The order of display (Display order) is shown on the horizontal axis and the reference layer information is shown on the vertical axis in FIG. 6. The squares are a picture. The alphabet in the square is the type of the picture. The number is the reference layer information. The arrows indicate the reference relationship. The picture of the square on the tip of an arrow refers to the picture on the bottom of the arrow.

As illustrated in FIG. 6, each picture does not refer to the picture having the reference layer information larger than the reference layer information of each picture.

Specifically, an I picture and two P pictures have the reference layer information indicating zero among the nine pictures of the GOP in the example of FIG. 6. Two B pictures have the reference layer information indicating one. Four B pictures have the reference layer information indicating two.

Thus, the I picture and two P pictures having the reference layer information indicating zero do not reference to the B pictures having the reference layer information indicating one or two. The two B pictures having the reference layer information indicating one do not refer to the four B pictures having the reference layer information indicating two.

The reproducing device 2 selects and decodes the pictures having the reference layer information lower than or equal to a threshold. This enables the reproducing device 2 to decode the pictures while excluding the pictures having the reference layer information higher than the threshold. For example, the reproducing device 2 can decode the pictures while excluding the six B pictures having the reference layer information larger than zero by selecting and decoding the pictures having the reference layer information lower than or equal to zero. Alternatively, the reproducing device 2 can decode the pictures while excluding the four B pictures having the reference layer information larger than one by selecting and decoding the pictures having the reference layer information lower than or equal to one. As a result, the reproducing device 2 can perform trick play.

Furthermore, the reproducing device 2 can easily control the granularity in trick play by changing the threshold. On the other hand, when trick play is performed based on the "picture_type", the only thing that the reproducing device can do in the trick play is to select and reproduce only the I pictures that do not refer to the other pictures because the reproducing device does not recognize the reference relationship among the pictures.

Furthermore, in the recording/reproducing system in FIG. 1, the reference layer information about all of the pictures of a GOP including the first picture of the GOP is described in the GOP structure map stored in the SEI of the first picture as illustrated in FIGS. 4 and 5.

Thus, the reproducing device 2 can acquire the reference layer information about all of the pictures of a GOP only by parsing the GOP structure map. Thus, the reproducing device 2 can easily perform trick play by parsing and decoding only AUs of the pictures having the reference layer information lower than or equal to the threshold among the pictures other than the first picture of the GOP in accordance with the provided reference layer information and decoding the pictures having the reference layer information lower than or equal to the threshold.

On the other hand, when a GOP structure map indicating the reference layer information about a whole GOP is not stored in the SEI of the first picture of the GOP, it is necessary to determine whether to decode each picture by parsing the NAL headers in the encoded data in the AUs of all of the pictures of the GOP and acquiring the "nuh_temporal_id_plus1". Thus, the AU of the picture that is not to be decoded is unnecessarily parsed.

(Exemplary Configuration of Video Encoder)

Figure 7:
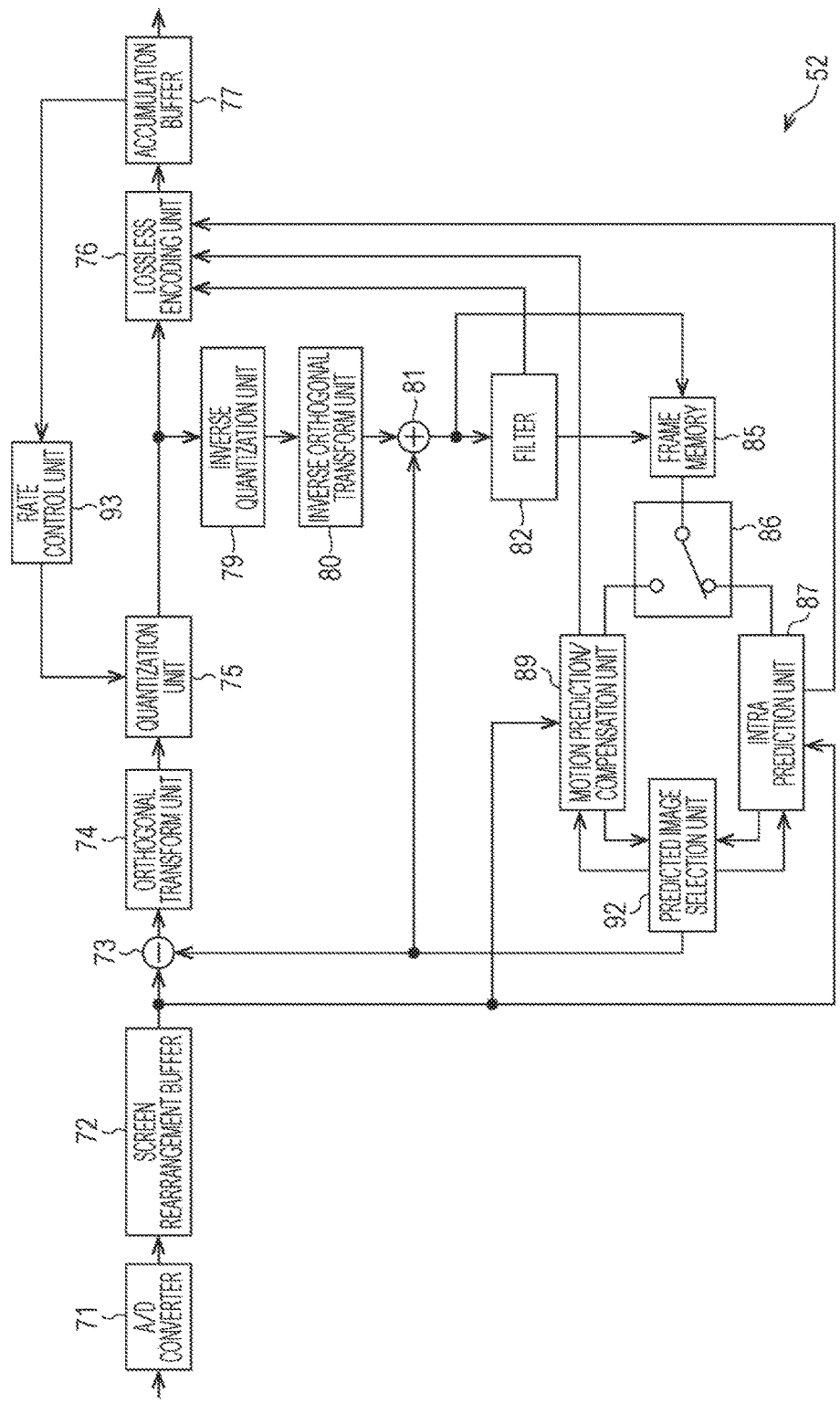
FIG. 7 is a block diagram of an exemplary configuration of a video encoder in FIG. 3.

FIG. 7 is a block diagram of an exemplary configuration of the video encoder 52 illustrated in FIG. 3.

The video encoder 52 of FIG. 7 includes an A/D converter 71, a screen rearrangement buffer 72, an arithmetic unit 73, an orthogonal transform unit 74, a quantization unit 75, a lossless encoding unit 76, an accumulation buffer 77, an inverse quantization unit 79, an inverse orthogonal transform unit 80, and an addition unit 81. The video encoder 52 further includes a filter 82, a frame memory 85, a switch 86, an intra prediction unit 87, a motion prediction/compensation unit 89, a predicted image selection unit 92, and a rate control unit 93.

The A/D converter 71 of the video encoder 52 converts the analog signal of each of the input pictures in A/D conversion, and outputs and stores the converted digital signal of each picture into the screen rearrangement buffer 72.

The screen rearrangement buffer 72 rearranges the pictures stored in order of display in an order for encoding in accordance with the GOP structure. The screen rearrangement buffer 72 outputs the rearranged pictures as the current pictures to the arithmetic unit 73, the intra prediction unit 87, and the motion prediction/compensation unit 89.

The arithmetic unit 73 encodes the pictures in the CU by subtracting the predicted images provided from the predicted image selection unit 92 from the provided current pictures provided from the screen rearrangement buffer 72. The arithmetic unit 73 outputs the pictures generated by the encoding as the residual information to the orthogonal transform unit 74. Note that, when the predicted image selection unit 92 does not provide the predicted images, the arithmetic unit 73 outputs the current pictures read from the screen rearrangement buffer 72 as the residual information without subtraction to the orthogonal transform unit 74.

The orthogonal transform unit 74 orthogonally transforms the residual information from the arithmetic unit 73 in the Transform Unit (TU). The orthogonal transform unit 74 provides the orthogonal transform coefficient that is the result of the orthogonal transform to the quantization unit 75.

The quantization unit 75 quantizes the orthogonal transform coefficient provided from the orthogonal transform unit 74. The quantization unit 75 provides the quantized orthogonal transform coefficient to the lossless encoding unit 76.

The lossless encoding unit 76 acquires the intra prediction mode information indicating the optimal intra prediction mode from the intra prediction unit 87. The lossless encoding unit 76 further acquires, for example, the inter prediction mode information indicating the optimal inter prediction mode, the reference picture identification information used to identifying the reference picture, and the motion vector information from the motion prediction/compensation unit 89. The lossless encoding unit 76 further acquires the offset filter information about the adaptive offset filtering process from the filter 82.

The lossless encoding unit 76 losslessly encodes the quantized orthogonal transform coefficient provided from the quantization unit 75, for example, in variable length coding (such as Context-Adaptive Variable Length Coding (CAVLC)), or in arithmetic coding (such as Context-Adaptive Binary Arithmetic Coding (CABAC)).

The lossless encoding unit 76 losslessly encodes, for example, the intra prediction mode information or the inter prediction mode information, and the motion vector information and the reference picture identification information, and the offset filter information as the coding information about the encoding. The lossless encoding unit 76 places the losslessly encoded coding information in units of slices, for example, in the slice header. The lossless encoding unit 76 adds the slice header to the losslessly encoded orthogonal transform coefficient in units of slices, and provides the losslessly encoded orthogonal transform coefficient as the encoded data in units of slices to the accumulation buffer 77.

The accumulation buffer 77 temporarily stores the encoded data in units of slices provided from the lossless encoding unit 76. The accumulation buffer 77 provides the stored encoded data in units of slices to the NAL unit generator 53 in FIG. 3.

The quantized orthogonal transform coefficient output from the quantization unit 75 is input also to the inverse quantization unit 79. The inverse quantization unit 79 inversely quantizes the orthogonal transform coefficient quantized by the quantization unit 75 in a method corresponding to the quantization method by the quantization unit 75. The inverse quantization unit 79 provides the orthogonal transform coefficient generated by the inverse quantization to the inverse orthogonal transform unit 80.

The inverse orthogonal transform unit 80 inversely orthogonally transforms the orthogonal transform coefficient provided from the inverse quantization unit 79 in the TU in a method corresponding to the orthogonal transform method by the orthogonal transform unit 74. The inverse orthogonal transform unit 80 provides the residual information generated by the inverse orthogonal transform to the addition unit 81.

The addition unit 81 locally decodes the current pictures in the CU by adding the residual information provided from the inverse orthogonal transform unit 80 to the predicted images provided from the predicted image selection unit 92. Note that, when the predicted image selection unit 92 does not provide the predicted images, the addition unit 81 determines the residual information provided from the inverse orthogonal transform unit 80 as the result of the decoding. The addition unit 81 provides the locally decoded current pictures to the frame memory 85. The addition unit 81 provides the fully decoded current pictures as the encoded pictures to the filter 82.

The filter 82 filters the encoded pictures provided from the addition unit 81 in a filtering process. Specifically, the filter 82 performs a deblocking filtering process and an adaptive offset filtering (Sample adaptive offset (SAO)) process in order. The filter 82 provides the filtered encoded pictures to the frame memory 85. The filter 82 further provides the information indicating the type of the performed adaptive offset filtering process and the offset as the offset filter information to the lossless encoding unit 76.

The frame memory 85 stores the current pictures provided from the addition unit 81 and the encoded pictures provided from the filter 82. The pixels adjacent to the current blocks that are a Prediction Unit (PU) to be processed in the current picture are provided as the peripheral pixels to the intra prediction unit 87 via the switch 86. The encoded pictures are output as the reference picture candidates to the motion prediction/compensation unit 89 via the switch 86.

The intra prediction unit 87 predicts the current blocks, using the peripheral pixels read from the frame memory 85 via the switch 86 in intra prediction processes in all of the intra prediction mode candidates.

The intra prediction unit 87 calculates the cost function values (to be described in detail below) of all of the intra prediction mode candidates based on the current pictures read from the screen rearrangement buffer 72 and the predicted images generated by the intra prediction processes. Then, the intra prediction unit 87 determines the intra prediction mode having the smallest cost function value as the optimal intra prediction mode.

The intra prediction unit 87 provides the predicted image generated in the optimal intra prediction mode and the corresponding cost function value to the predicted image selection unit 92. When the predicted image selection unit 92 notifies the intra prediction unit 87 of the fact that the predicted image generated in the optimal intra prediction mode is selected, the intra prediction unit 87 provides the intra prediction mode information to the lossless encoding unit 76.

Note that the cost function value is referred to also as a Rate Distortion (RD) cost, and is calculated, for example, in a method in a High Complexity mode or a Low Complexity mode, which is prescribed in Joint Model (JM) that is reference software in the H.264/AVC scheme. Note that the reference software in the H.264/AVC scheme is available on http://iphome.hhi.de/suehring/tml/index.htm.

Specifically, when the High Complexity mode is used as the method for calculating the cost function value, the process to the decoding is provisionally performed in all of the prediction mode candidates so that the cost function value of each prediction mode shown in the next expression (1) is calculated.

[Mathematical Formula 1]

$$\text{Cost(Mode)} = D + \lambda \cdot R \quad (1)$$

The D is the difference (distortion) between an original image and the decoded image, the R is the number of generated codes including the orthogonal transform coefficient, the λ is Lagrange undetermined multipliers given as the function of the quantization parameter QP.

On the other hand, when the Low Complexity mode is used as the method for calculating the cost function value, the predicted image is generated and the number of codes of the coding information is calculated in all of the prediction mode candidates so that the cost function Cost (Mode) of each prediction mode shown in the next expression (2) is calculated.

[Mathematical Formula 2]

$$\text{Cost(Mode)} = D + \text{QPtoQuant(QP)} \cdot \text{Header\_Bit} \quad (2)$$

The D is the difference (distortion) between an original image and the predicted image, the Header_Bit is the number of codes of the coding information, and the QPtoQuant is the function given as the function of the quantization parameter QP.

In the Low Complexity mode, it is necessary only to generate the predicted image in all of the prediction modes and it is unnecessary to generate the decoded image. This advantageously reduces the calculation.

The motion prediction/compensation unit 89 predicts and compensates the motion of the current blocks in a motion prediction/compensation processes in all of the inter prediction mode candidates, using the reference picture candidates. Specifically, the motion prediction/compensation unit 89 detects the motion vectors of the current blocks in all of the inter prediction mode candidates in accordance with the current pictures from the screen rearrangement buffer 72 and the reference picture candidates read from the frame memory 85 via the switch 86. Note that the inter prediction mode is the mode, for example, in which the size of the current blocks is indicated. The motion prediction/compensation unit 89 compensates the reference picture candidates in accordance with the detected motion vectors so as to generate the predicted images.

The motion prediction/compensation unit 89 calculates the cost function values of all of the inter prediction mode candidates and the reference pictures in accordance with the current pictures read from the screen rearrangement buffer 72 and the predicted images. The motion prediction/compensation unit 89 determines the inter prediction mode having the smallest cost function value as the optimal inter prediction mode, and determines the reference picture candidate as the reference picture. The motion prediction/compensation unit 89 provides the smallest cost function value and the corresponding predicted images to the predicted image selection unit 92.

When the predicted image selection unit 92 notifies the motion prediction/compensation unit 89 of the fact that the predicted images generated in the optimal inter prediction mode is selected, the motion prediction/compensation unit 89 generates the motion vector information indicating the motion vectors corresponding to the predicted images. The motion prediction/compensation unit 89 provides the inter prediction mode information, the motion vector information, and the reference picture identification information to the lossless encoding unit 76.

The predicted image selection unit 92 determines one, which has the smaller cost function value, of the optimal intra prediction mode and the optimal inter prediction mode as the optimal prediction mode in accordance with the cost function values provided from the intra prediction unit 87 and the motion prediction/compensation unit 89. Then, the predicted image selection unit 92 provides the predicted images in the optimal prediction mode to the arithmetic unit 73 and the addition unit 81. The predicted image selection unit 92 notifies the intra prediction unit 87 or the motion prediction/compensation unit 89 of the fact that the predicted images in the optimal prediction mode are selected.

The rate control unit 93 controls the rate of the quantization operation by the quantization unit 75 in accordance with the encoded data accumulated in the accumulation buffer 77 in order to prevent overflow or underflow in the quantization.

(Description of Process that File Generation Unit Performs)

Figure 8:
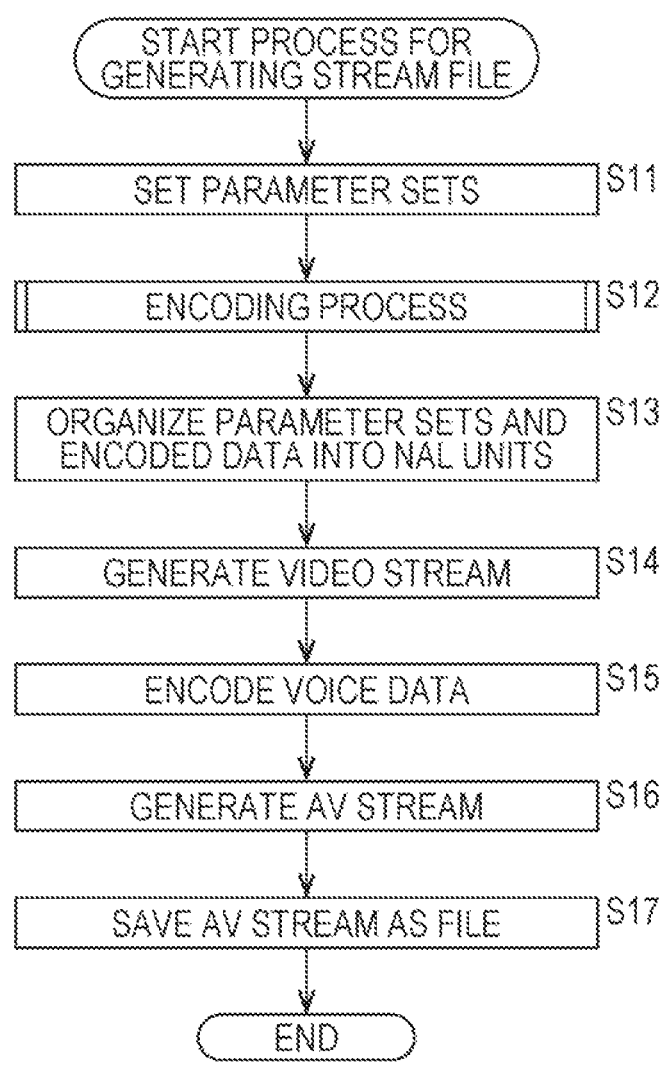
FIG. 8 is an explanatory flowchart of a process in which the file generation unit in FIG. 3 generates a stream file.

FIG. 8 is an explanatory flowchart of the stream file generating process that the file generation unit 50 in FIG. 3 performs.

In step S11 of FIG. 8, the setting unit 51 of the file generation unit 50 sets parameter sets including the SEI of the first picture including the GOP structure map. The setting unit 51 provides the set parameter sets to the video encoder 52 and the NAL unit generator 53.

In step S12, the video encoder 52 encodes each picture of the video data input from the outside in the CU in the HEVC scheme. This encoding process will be described in detail below with reference to FIGS. 9 and 10.

In step S13, the NAL unit generator 53 organizes the parameter sets provided from the setting unit 51 and the encoded data provided from the video encoder 52 into NAL units so as to generate NAL units. The NAL unit generator 53 provides the generated NAL units to the multiplexer 54.

In step S14, the multiplexer 54 generates AUs by putting together the NAL units provided from the NAL unit generator 53 by the picture, and generates a video stream including one or more AUs. The multiplexer 54 provides the video stream to the file generator 56.

In step S15, the voice encoder 55 encodes the input voice data, and provides the voice stream generated by the encoding to the file generator 56.

In step S16, the file generator 56 generates an AV stream by multiplexing the video stream provided from the multiplexer 54 and the voice stream provided from the voice encoder 55.

In step S17, the file generator 56 generates a stream file by saving the AV stream as a file, and outputs the stream file. The stream file is recorded on the optical disk 11.

Figure 9:
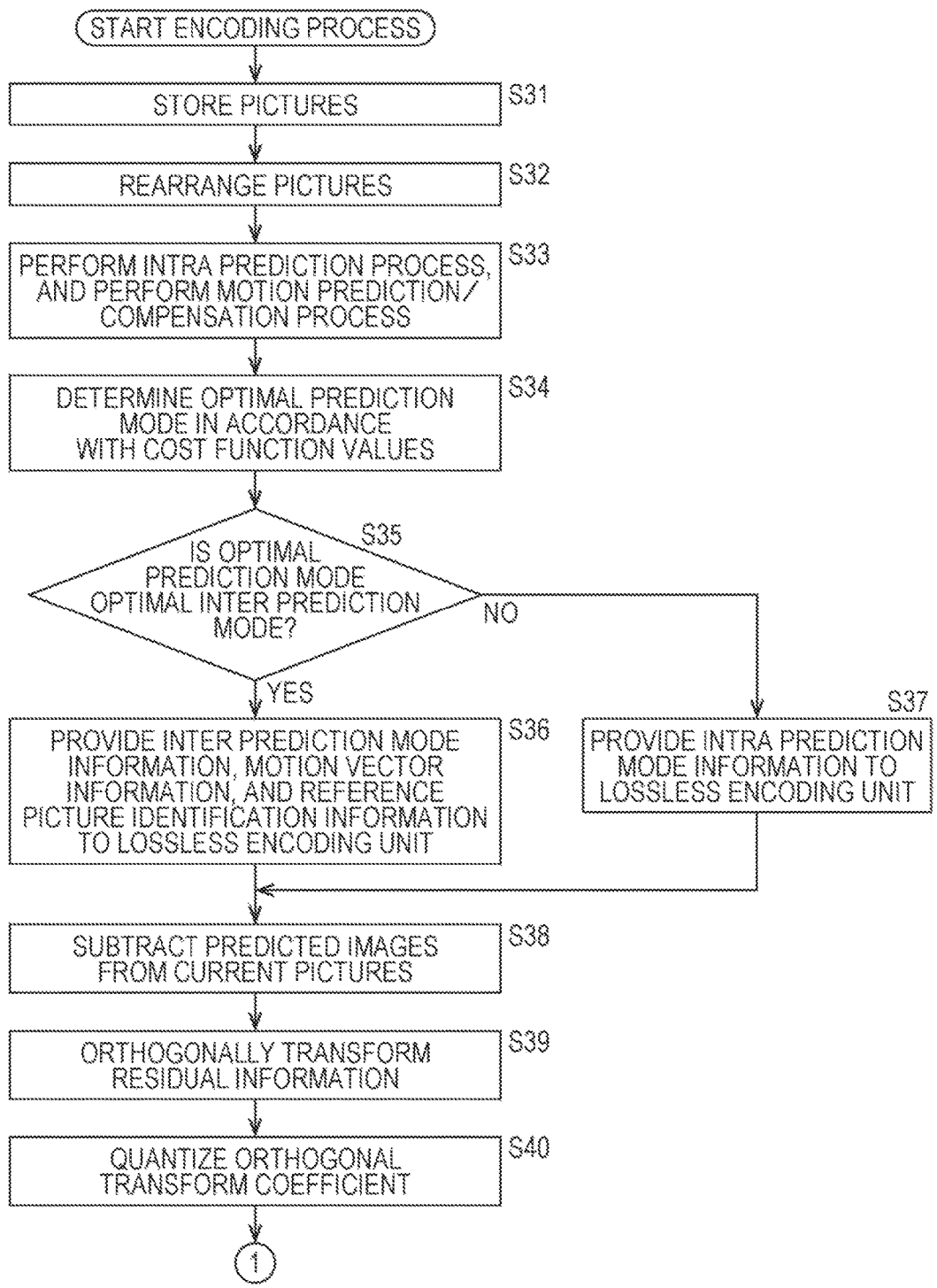
FIG. 9 is an explanatory flowchart of the details of the encoding process in FIG. 8.
Figure 10:
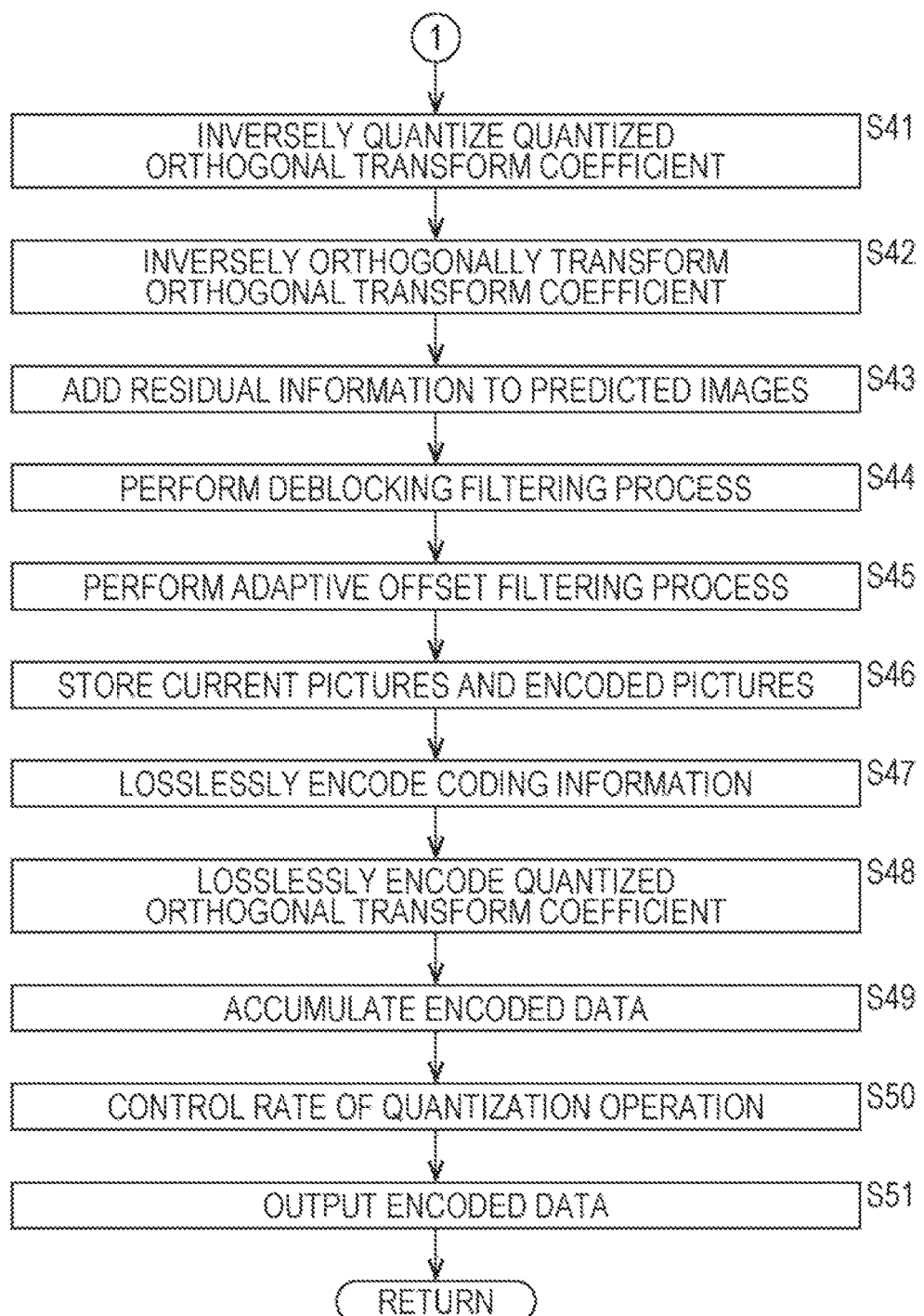
FIG. 10 is an explanatory flowchart of the details of the encoding process in FIG. 8.

FIGS. 9 and 10 are an explanatory flowchart of the details of the encoding process in step S12 of FIG. 8.

In step S31 of FIG. 9, the A/D converter 71 (FIG. 7) of the video encoder 52 converts the analog signal of each input picture in A/D conversion, and outputs and stores the converted digital signal of each picture into the screen rearrangement buffer 72.

In step S32, the screen rearrangement buffer 72 rearranges the stored pictures in order of display in an order for encoding in accordance with the GOP structure. The screen rearrangement buffer 72 outputs the rearranged pictures as the current pictures to the arithmetic unit 73, the intra prediction unit 87, and the motion prediction/compensation unit 89.

In step S33, the intra prediction unit 87 predicts the current blocks in the intra prediction processes in all of the intra prediction mode candidates, using the peripheral pixels read from the frame memory 85 via the switch 86. The intra prediction unit 87 calculates the cost function values of all of the intra prediction mode candidates in accordance with the current pictures from the screen rearrangement buffer 72 and the predicted images provided by the intra prediction process. Then, the intra prediction unit 87 determines the intra prediction mode having the smallest cost function value as the optimal intra prediction mode. The intra prediction unit 87 provides the predicted images generated in the optimal intra prediction mode and the corresponding cost function value to the predicted image selection unit 92.

The motion prediction/compensation unit 89 predicts and compensates the motion of the current blocks in the motion prediction/compensation processes in all of the inter prediction mode candidates, using the reference picture candidates. The motion prediction/compensation unit 89 calculates the cost function values of all of the inter prediction mode candidates and reference pictures in accordance with the current pictures from the screen rearrangement buffer 72 and the predicted images generated by the motion prediction/compensation processes. The motion prediction/compensation unit 89 determines the inter prediction mode having the smallest cost function value as the optimal inter prediction mode, and determines the reference picture candidate as the reference picture. Then, the motion prediction/compensation unit 89 provides the smallest cost function value and the corresponding predicted images to the predicted image selection unit 92.

In step S34, the predicted image selection unit 92 determines one, which has the smallest cost function value, of the optimal intra prediction mode and the optimal inter prediction mode as the optimal prediction mode in accordance with the cost function values provided from the intra prediction unit 87 and the motion prediction/compensation unit 89. Then, the predicted image selection unit 92 provides the predicted images in the optimal prediction mode to the arithmetic unit 73 and the addition unit 81.

In step S35, the predicted image selection unit 92 determines whether the optimal prediction mode is the optimal inter prediction mode. When the predicted image selection unit 92 determines in step S35 that the optimal prediction mode is the optimal inter prediction mode, the predicted image selection unit 92 notifies the motion prediction/compensation unit 89 of the fact that the predicted images generated in the optimal inter prediction mode are selected.

The motion prediction/compensation unit 89 generates the motion vector information indicating the motion vectors in the current blocks corresponding to the predicted images in response to the notification. In step S36, the motion prediction/compensation unit 89 provides the inter prediction mode information, the motion vector information, and the reference picture identification information to the lossless encoding unit 76. Then, the process goes to step S38.

On the other hand, when the predicted image selection unit 92 determines in step S35 that the optimal prediction mode is not the optimal inter prediction mode, in other words, that the optimal prediction mode is the optimal intra prediction mode, the predicted image selection unit 92 notifies the intra prediction unit 87 of the fact that the predicted images generated in the optimal intra prediction mode are selected. In step S37, the intra prediction unit 87 provides the intra prediction mode information to the lossless encoding unit 76. Then, the process goes to step S38.

In step S38, the arithmetic unit 73 performs encoding by subtracting the predicted images provided from the predicted image selection unit 92 from the current pictures provided from the screen rearrangement buffer 72. The arithmetic unit 73 outputs the pictures generated by the encoding as the residual information to the orthogonal transform unit 74.

In step S39, the orthogonal transform unit 74 orthogonally transforms the residual information from the arithmetic unit 73 in the TU, and provides the orthogonal transform coefficient generated by the orthogonal conversion to the quantization unit 75.

In step S40, the quantization unit 75 quantizes the orthogonal transform coefficient provided from the orthogonal transform unit 74, and provides the quantized orthogonal transform coefficient to the lossless encoding unit 76 and the inverse quantization unit 79.

In step S41 of FIG. 10, the inverse quantization unit 79 inversely quantizes the quantized orthogonal transform coefficient provided from the quantization unit 75, and provides the orthogonal transform coefficient generated by the inverse quantization to the inverse orthogonal transform unit 80.

In step S42, the inverse orthogonal transform unit 80 inversely orthogonally transforms the orthogonal transform coefficient provided from the inverse quantization unit 79 in the TU, and provides the residual information generated by the inverse orthogonal transform to the addition unit 81.

In step S43, the addition unit 81 locally decodes the current pictures by adding the residual information provided from the inverse orthogonal transform unit 80 to the predicted images provided from the predicted image selection unit 92. The addition unit 81 provides the locally decoded current pictures to the frame memory 85. The addition unit 81 provides the fully decoded current pictures as the decoded pictures to the filter 82.

In step S44, the filter 82 filters the encoded pictures provided from the addition unit 81 in the deblocking filtering process.

In step S45, the filter 82 filters the encoded pictures filtered by the deblocking filtering process in the Largest Coding Unit (LCU) in an adaptive offset filtering process. The filter 82 provides the encoded pictures generated by the adaptive offset filtering process to the frame memory 85. The filter 82 provides the offset filter information in the LCU to the lossless encoding unit 76.

In step S46, the frame memory 85 stores the current pictures provided from the addition unit 81 and the encoded pictures provided from the filter 82. The pixels adjacent to the current blocks in the current pictures are provided as the peripheral pixels to the intra prediction unit 87 via the switch 86. The encoded pictures are output as the reference picture candidates to the motion prediction/compensation unit 89 via the switch 86.

In step S47, the lossless encoding unit 76 losslessly encodes the intra prediction mode information or the inter prediction mode information, and the motion vector information and the reference picture identification information, and the offset filter information as the coding information.

In step S48, the lossless encoding unit 76 losslessly encodes the quantized orthogonal transform coefficient provided from the quantization unit 75. The lossless encoding unit 76 generates the encoded data in units of slices by placing the coding information losslessly encoded in the process of step S47 in units of slices and adding the coding information to the losslessly encoded orthogonal transform coefficient in units of slices. The lossless encoding unit 76 provides the encoded data in units of slices to the accumulation buffer 77.

In step S49, the accumulation buffer 77 temporarily accumulates the encoded data in units of slices provided from the lossless encoding unit 76.

In step S50, the rate control unit 93 controls the rate of the quantization operation by the quantization unit 75 in accordance with the encoded data accumulated in the accumulation buffer 77 in order to prevent overflow or underflow in the quantization.

In step S51, the accumulation buffer 77 outputs the stored encoded data in units of slices to the NAL unit generator 53 in FIG. 3. Then, the process returns to step S12 in FIG. 8, and goes to step S13.

To simplify the description, the intra prediction process and the motion prediction/compensation process are constantly performed in the encoding process in FIGS. 9 and 10. Note that, however, actually only one of the intra prediction process and the motion prediction/compensation process is sometimes performed depending on the type of the picture.

As described above, the file generation unit 50 sets the SEI including the reference layer information. This enables the reproducing device 2 to easily perform trick play in accordance with the reference layer information included in the SEI without parsing the encoded data other than the encoded data of the pictures having the reference layer information lower than or equal to the threshold.

The reproducing device 2 can easily control the granularity in trick play in accordance with the reference layer information included in the SEI by changing the threshold. This means that the file generation unit 50 can set the information allowing for easily controlling the granularity in trick play.

(Exemplary Configuration of Fast-Forward Reproducing Unit)

Figure 11:
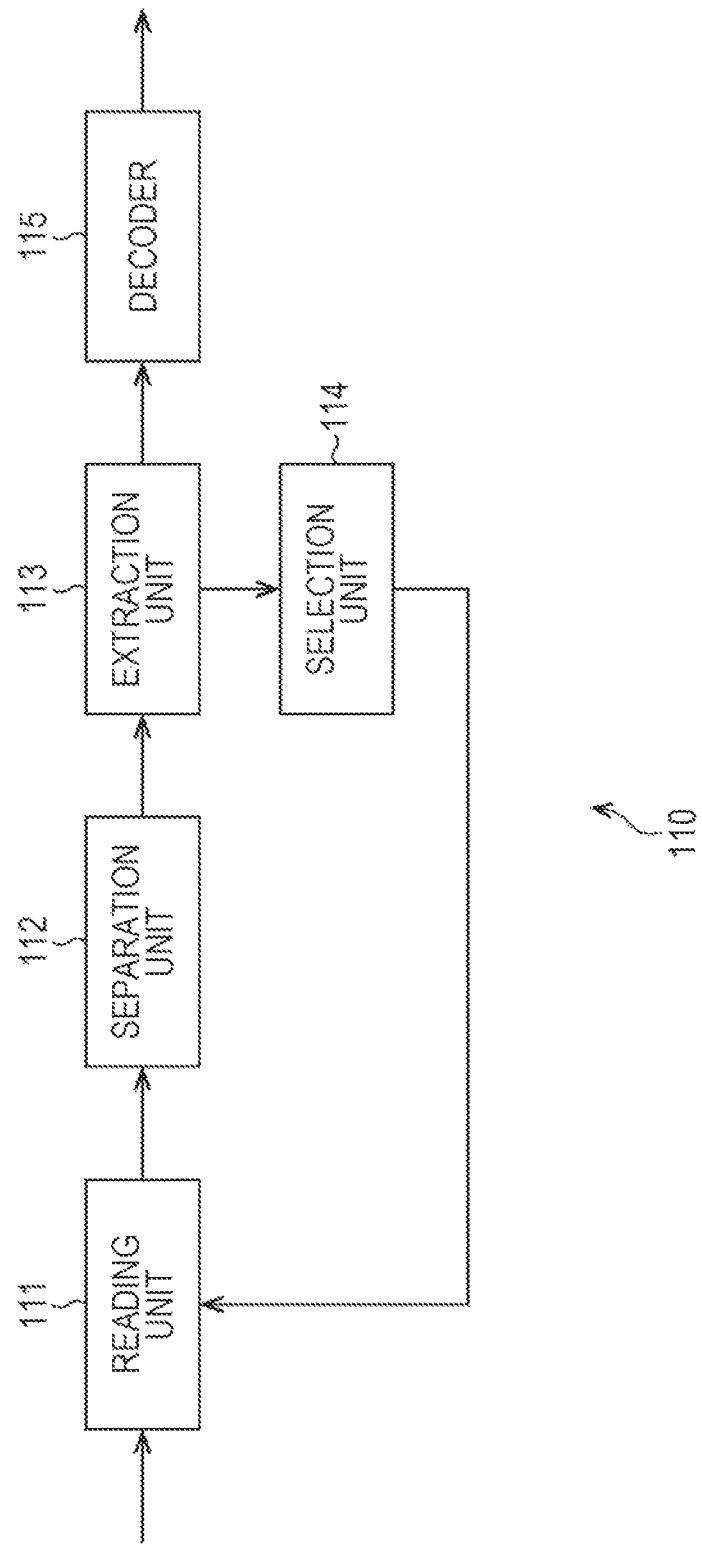
FIG. 11 is a block diagram of an exemplary configuration of a fast-forward reproducing unit.

FIG. 11 is a block diagram of an exemplary configuration of the fast-forward reproducing unit of the reproducing device 2 in FIG. 1. The fast-forward reproducing unit fast-forward reproduces the video stream of the stream file recorded on the optical disk 11.

A fast-forward reproducing unit 110 in FIG. 11 includes a reading unit 111, a separation unit 112, an extraction unit 113, a selection unit 114, and a decoder 115.

The reading unit 111 of the fast-forward reproducing unit 110 reads the AU of the first picture of the AV stream stored as a stream file in the optical disk 11. The reading unit 111 reads the AUs of the pictures indicated in the selected picture information provided from the selection unit 114 in the AV stream stored as the stream file in the optical disk 11. The reading unit 111 provides the read AUs to the separation unit 112.

The separation unit 112 receives the AUs provided from the reading unit 111. The separation unit 112 separates the NAL units included in the AU and provides the separated NAL units to the extraction unit 113.

The extraction unit 113 extracts the parameter sets and the encoded data in units of slices from the NAL units provided from the separation unit 112 and provides the parameter sets and the encoded data to the decoder 115. The extraction unit 113 provides the GOP structure map stored in the SEI of the first picture among the parameter sets to the selection unit 114.

The selection unit 114 selects the pictures other than the first picture and to be fast-forward reproduced in accordance with the GOP structure map provided from the extraction unit 113. Specifically, the selection unit 114 selects the pictures other than the first picture and having the reference layer information is lower than or equal to the threshold in accordance with the reference layer information of each picture in the GOP described in the GOP structure map. The threshold is determined, for example, in accordance with the granularity of fast-forward reproducing designated by the user. The selection unit 114 provides the selected picture information indicating the selected pictures to the reading unit 111.

The decoder 115 decodes the encoded data in units of slices provided from the extraction unit 113 in the CU in the HEVC scheme. Meanwhile, the decoder 115 refers to the parameter sets provided from the extraction unit 113 as necessary. The decoder 115 outputs the pictures generated by the decoding to the display device 3 in FIG. 1.

(Exemplary Configuration of Decoder)

Figure 12:
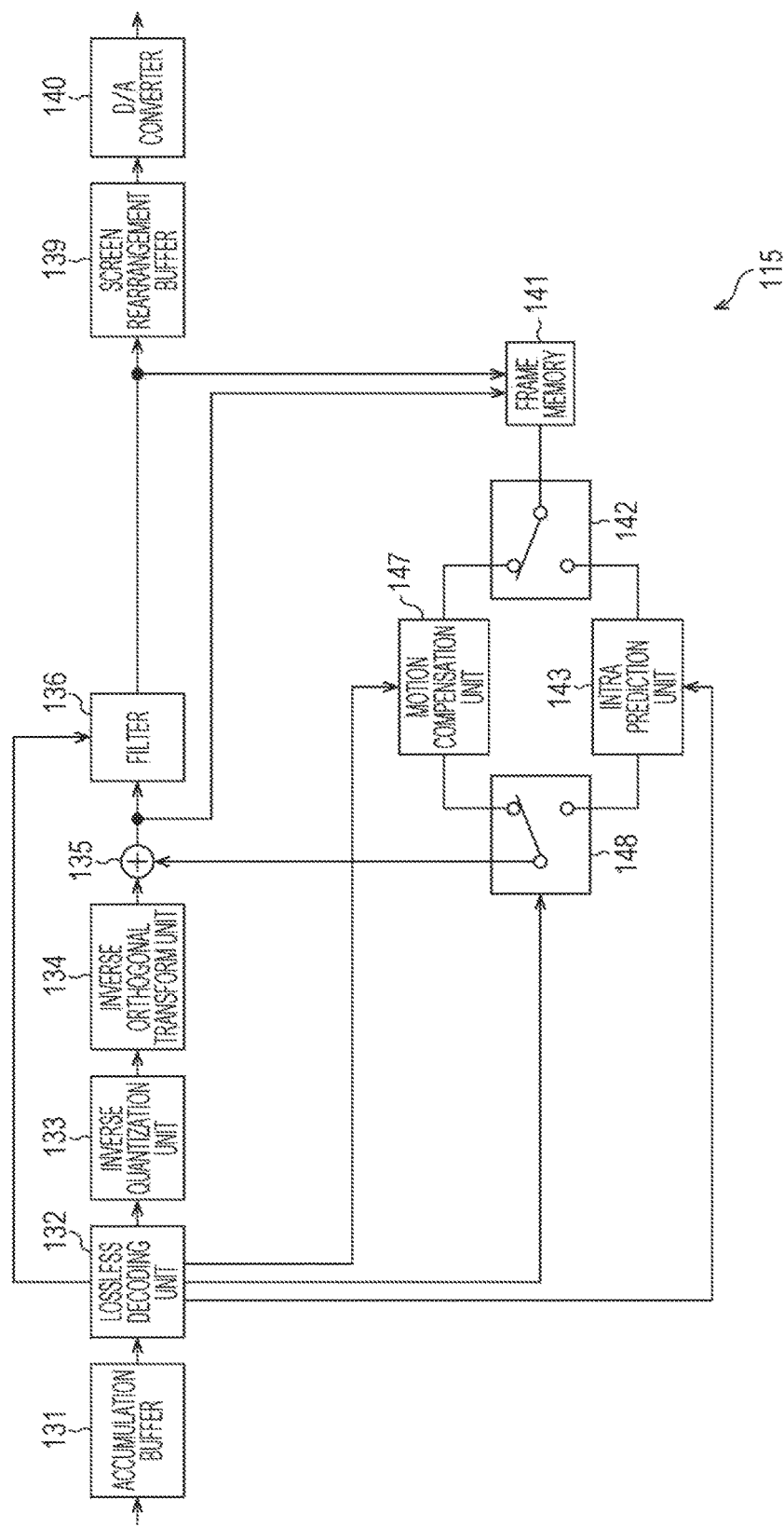
FIG. 12 is a block diagram of an exemplary configuration of a decoder in FIG. 11.

FIG. 12 is a block diagram of an exemplary configuration of the decoder 115 in FIG. 11.

The decoder 115 in FIG. 12 includes an accumulation buffer 131, a lossless decoding unit 132, an inverse quantization unit 133, an inverse orthogonal transform unit 134, an addition unit 135, a filter 136, and a screen rearrangement buffer 139. The decoder 115 further includes a D/A converter 140, a frame memory 141, a switch 142, an intra prediction unit 143, a motion compensation unit 147, and a switch 148.

The accumulation buffer 131 of the decoder 115 receives and accumulates the encoded data in units of slices from the extraction unit 113 in FIG. 11. The accumulation buffer 131 provides the accumulated encoded data in units of pictures as the encoded data of the current pictures to the lossless decoding unit 132.

The lossless decoding unit 132 acquires the quantized orthogonal transform coefficient and the coding information by losslessly decoding the encoded data from the accumulation buffer 131 in lossless decoding, such as variable length decoding or arithmetic decoding, corresponding to the lossless encoding performed by the lossless encoding unit 76 in FIG. 7. The lossless decoding unit 132 provides the quantized orthogonal transform coefficient to the inverse quantization unit 133. Meanwhile, the lossless decoding unit 132 provides, for example, the intra prediction mode information as the coding information to the intra prediction unit 143. The lossless decoding unit 132 provides the reference picture identification information, the motion vector information, and the inter prediction mode information to the motion compensation unit 147.

Furthermore, the lossless decoding unit 132 provides the intra prediction mode information or the inter prediction mode information as the coding information to the switch 148. The lossless decoding unit 132 provides the offset filter information as the coding information to the filter 136.

The inverse quantization unit 133, the inverse orthogonal transform unit 134, the addition unit 135, the filter 136, the frame memory 141, the switch 142, the intra prediction unit 143, and the motion compensation unit 147 perform the similar processes to the processes performed by the inverse quantization unit 79, the inverse orthogonal transform unit 80, the addition unit 81, the filter 82, the frame memory 85, the switch 86, the intra prediction unit 87, and the motion prediction/compensation unit 89 in FIG. 7, respectively. This decodes the pictures in the CU.

Specifically, the inverse quantization unit 133 inversely quantizes the quantized orthogonal transform coefficient from the lossless decoding unit 132, and provides the orthogonal transform coefficient generated by the inverse quantization to the inverse orthogonal transform unit 134.

The inverse orthogonal transform unit 134 inversely orthogonally transforms the orthogonal transform coefficient from the inverse quantization unit 133 in the TU. The inverse orthogonal transform unit 134 provides the residual information generated by the inverse orthogonal transform to the addition unit 135.

The addition unit 135 locally decodes the current pictures in the CU by adding the residual information provided from the inverse orthogonal transform unit 134 to the predicted images provided from the switch 148. Note that, when the predicted images are not provided from the switch 148, the addition unit 135 determines the residual information provided from the inverse orthogonal transform unit 134 as the result of the decoding. The addition unit 135 provides the current pictures locally decoded to the frame memory 141. Meanwhile, the addition unit 135 provides the fully decoded current pictures as the decoded pictures to the filter 136.

The filter 136 filters the decoded pictures provided from the addition unit 135 in a filtering process. Specifically, the filter 136 first filters the decoded pictures in a deblocking filtering process. Subsequently, the filter 136 filters the decoded pictures filtered by the deblocking filtering process in the LCU in an adaptive offset filtering process that is the type indicated in the offset filter information, using the offset indicated in the offset filter information from the lossless decoding unit 132. The filter 136 provides the decoded pictures filtered by the adaptive offset filtering process to the frame memory 141 and the screen rearrangement buffer 139.

The screen rearrangement buffer 139 stores the decoded pictures provided from the filter 136. The screen rearrangement buffer 139 rearranges the stored decoded pictures in order for encoding in the original order of display, and provides the stored decoded pictures to the D/A converter 140.

The D/A converter 140 converts the decoded pictures in units of frames provided from the screen rearrangement buffer 139 in D/A conversion, and outputs the D/A converted decoded pictures to the display device 3 in FIG. 1.

The frame memory 141 stores the current pictures provided from the addition unit 135, and the decoded pictures provided from the filter 136. The pixels adjacent to the current blocks in the current pictures are provided as the peripheral pixels to the intra prediction unit 143 via the switch 142. The decoded pictures are output as reference pictures to the motion compensation unit 147 via the switch 142.

The intra prediction unit 143 predicts the current blocks in the intra prediction process in the optimal intra prediction mode indicated in the intra prediction mode information provided from the lossless decoding unit 132, using the peripheral pixels read from the frame memory 141 via the switch 142. The intra prediction unit 143 provides the predicted images generated by the intra prediction process to the switch 148.

The motion compensation unit 147 compensates the motion of the current blocks in accordance with the inter prediction mode information, reference picture identification information, and motion vector information from the lossless decoding unit 132 in a motion compensation process.

Specifically, the motion compensation unit 147 reads the reference pictures identified by the reference picture identification information from the frame memory 141 via the switch 142. The motion compensation unit 147 compensates the motion of the current blocks in the optimal inter prediction mode indicated in the inter prediction mode information in the motion compensation process, using the reference pictures and the motion vectors indicated in the motion vector information. The motion compensation unit 147 provides the predicted images generated by the motion compensation process to the switch 148.

When the lossless decoding unit 132 provides the intra prediction mode information to the switch 148, the switch 148 provides the predicted images provided from the intra prediction unit 143 to the addition unit 135. On the other hand, when the lossless decoding unit 132 provides the inter prediction mode information to the switch 148, the switch 148 provides the predicted images provided from the motion compensation unit 147 to the addition unit 135.

(Description of Process that Fast-Forward Reproducing Unit Performs)

Figure 13:
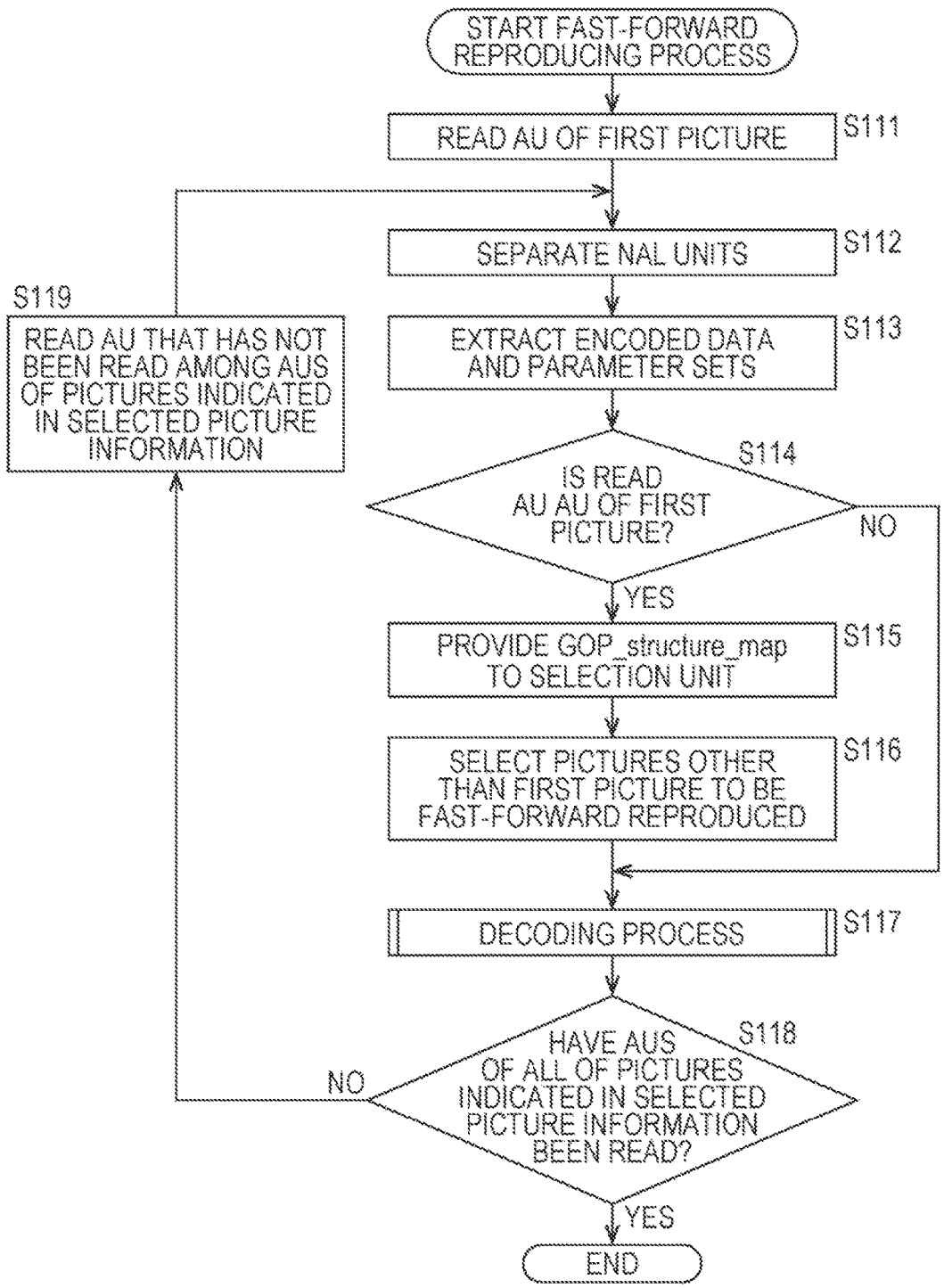
FIG. 13 is an explanatory flowchart of a fast-forward reproducing process that the fast-forward reproducing unit in FIG. 11 performs.

FIG. 13 is an explanatory flowchart of a fast-forward reproducing that the fast-forward reproducing unit 110 in FIG. 11 performs. The fast-forward reproducing process is performed per GOP.

In step S111 of FIG. 13, the reading unit 111 of the fast-forward reproducing unit 110 reads the AU of the first picture of the AV stream stored as a stream file in the optical disk 11 and provides the AU to the separation unit 112.

In step S112, the separation unit 112 separates the NAL units included in the AU provided from the reading unit 111, and provides the separated NAL units to the extraction unit 113.

In step S113, the extraction unit 113 extracts the parameter sets and the encoded data in units of slices from the NAL units provided from the separation unit 112, and provides the parameter sets and the encoded data to the decoder 115.

In step S114, the fast-forward reproducing unit 110 determines whether the AU read by the reading unit 111 is the AU of the first picture. When the fast-forward reproducing unit 110 determines in step S114 that the read AU is the AU of the first picture, the process goes to step S115.

In step S115, the extraction unit 113 provides the GOP structure map stored in the SEI of the first picture among the parameter sets extracted in step S113 to the selection unit 114.

In step S116, the selection unit 114 selects the pictures other than the first picture and to be fast-forward reproduced in accordance with the GOP structure map provided from the extraction unit 113. The selection unit 114 provides the selected picture information indicating the selected pictures to the reading unit 111. Then, the process goes to step S117.

On the other hand, when the fast-forward reproducing unit 110 determines in step S114 that the read AU is not the AU of the first picture, in other words, when the read AU is the AU of the picture other than the first picture and without the GOP structure map, the process in steps S115 and S116 is not performed. Then, the process goes to step S117.

In step S117, the decoder 115 decodes the encoded data in units of slices provided from the extraction unit 113 in the CU in the HEVC scheme, using the parameter sets provided from the extraction unit 113 as necessary. The decoding process will be described in detail below with reference to FIG. 14.

In step S118, the reading unit 111 determines whether the AUs of all of the pictures indicated in the selected picture information have been read. When the reading unit 111 determines in step S118 that the AUs of all of the pictures indicated in the selected picture information have not been read, the process goes to step S119.

In step S119, the reading unit 111 reads the AUs that have not been read among the AUs of the pictures indicated in the selected picture information in the AV stream stored as the stream file in the optical disk 11. Then, the process returns to step S112, and the process in steps S112 to S119 is repeated until the AUs of all of the pictures indicated in the selected picture information are read.

On the other hand, when the reading unit 111 determines in step S118 that the AUs of all of the pictures indicated in the selected picture information have been read, the process is terminated.

Figure 14:
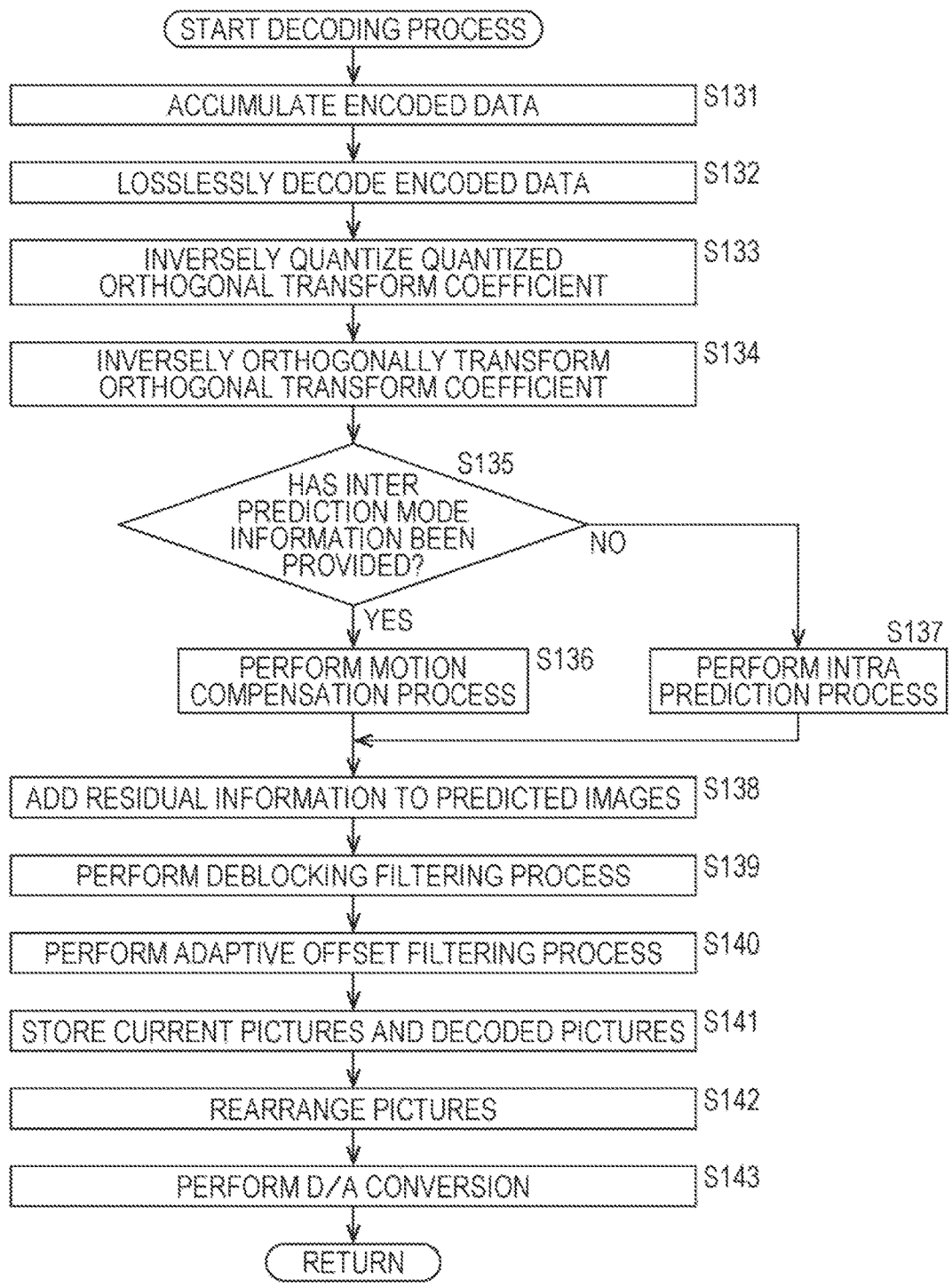
FIG. 14 is an explanatory flowchart of the details of the decoding process in FIG. 13.
Figure 15:
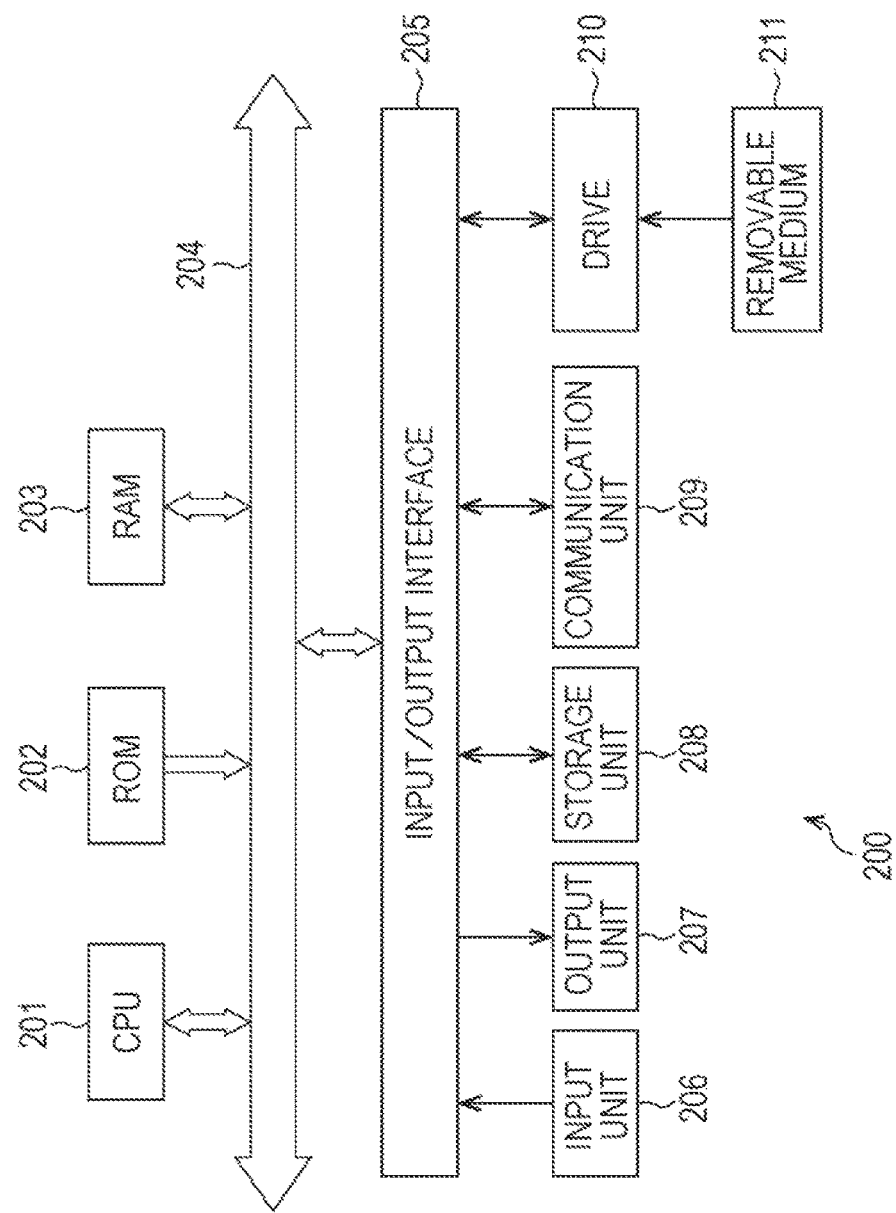
FIG. 15 is a block diagram of an exemplary configuration of the hardware of a computer.

FIG. 14 is an explanatory flowchart of the details of the decoding process in step S117 of FIG. 13.

In step S131 of FIG. 14, the accumulation buffer 131 (FIG. 12) of the decoder 115 receives the encoded data in units of slices from the extraction unit 113 in FIG. 11 and accumulates the encoded data. The accumulation buffer 131 provides the accumulated encoded data in units of pictures as the encoded data of the current pictures to the lossless decoding unit 132.

In step S132, the lossless decoding unit 132 acquires the quantized orthogonal transform coefficient and the coding information by losslessly decoding the encoded data from the accumulation buffer 131. The lossless decoding unit 132 provides the quantized orthogonal transform coefficient to the inverse quantization unit 133.

Meanwhile, the lossless decoding unit 132 provides, for example, the intra prediction mode information as the coding information to the intra prediction unit 143. The lossless decoding unit 132 provides the reference picture identification information, the motion vector information, and the inter prediction mode information to the motion compensation unit 147.

The lossless decoding unit 132 further provides the intra prediction mode information or the inter prediction mode information as the coding information to the switch 148. The lossless decoding unit 132 provides the offset filter information as the coding information to the filter 136.

In step S133, the inverse quantization unit 133 inversely quantizes the quantized orthogonal transform coefficient from the lossless decoding unit 132, and provides the orthogonal transform coefficient generated by the inverse quantization to the inverse orthogonal transform unit 134.

In step S134, the inverse orthogonal transform unit 134 inversely orthogonally transforms the orthogonal transform coefficient from the inverse quantization unit 133, and provides the residual information generated by the inverse orthogonal transform to the addition unit 135.

In step S135, the motion compensation unit 147 determines whether the lossless decoding unit 132 provides the inter prediction mode information to the motion compensation unit 147. When the motion compensation unit 147 determines in step S135 that the inter prediction mode information is provided, the process goes to step S136.

In step S136, the motion compensation unit 147 compensates the motion of the current blocks in accordance with the inter prediction mode information, reference picture identification information, and motion vector information from the lossless decoding unit 132 in the motion compensation process. The motion compensation unit 147 provides the predicted images generated by the motion compensation process to the addition unit 135 via the switch 148. Then, the process goes to step S138.

On the other hand, when the motion compensation unit 147 determines in step S135 that the inter prediction mode information is not provided, in other words, when the intra prediction mode information is provided to the intra prediction unit 143, the process goes to step S137.

In step S137, the intra prediction unit 143 predicts the current blocks in the intra prediction process in the optimal intra prediction mode indicated in the intra prediction mode information, using the peripheral pixels read from the frame memory 141 via the switch 142. The intra prediction unit 143 provides the predicted images generated by the intra prediction process to the addition unit 135 via the switch 148. Then, the process goes to step S138.

In step S138, the addition unit 135 locally decodes the current pictures by adding the residual information provided from the inverse orthogonal transform unit 134 to the predicted images provided from the switch 148. The addition unit 135 provides the locally decoded current pictures to the frame memory 141. The addition unit 135 provides the fully decoded current pictures as the decoded pictures to the filter 136.

In step S139, the filter 136 filters the decoded pictures provided from the addition unit 135 in the deblocking filtering process to remove the block distortion from the decoded pictures.

In step S140, the filter 136 filters the decoded pictures generated by the deblocking filtering process in the LCU in accordance with the offset filter information provided from the lossless decoding unit 132 in the adaptive offset filtering process. The filter 136 provides the images generated by the adaptive offset filtering process to the screen rearrangement buffer 139 and the frame memory 141.

In step S141, the frame memory 141 stores the current pictures provided from the addition unit 81 and the decoded pictures provided from the filter 136. The pixels adjacent to the current blocks in the current pictures are provided as the peripheral pixels to the intra prediction unit 143 via the switch 142. The decoded pictures are output as reference pictures to the motion compensation unit 147 via the switch 142.

In step S142, the screen rearrangement buffer 139 stores the decoded pictures provided from the filter 136, and rearranges the stored pictures in order for encoding in the original order of display, and provides the decoded pictures to the D/A converter 140.

In step S143, the D/A converter 140 converts the pictures provided from the screen rearrangement buffer 139 in D/A conversion, and outputs the D/A converted pictures to the display device 3 in FIG. 1. The process returns to step S117 in FIG. 13 and goes to step S118.

As described above, the fast-forward reproducing unit 110 selects the pictures to be fast-forward reproduced in accordance with the reference layer information included in the SEI. This enables the fast-forward reproducing unit 110 to easily perform fast-forward reproducing without parsing the encoded data other than the encoded data of the selected pictures. The fast-forward reproducing unit 110 can easily control the granularity in fast-forward reproducing in accordance with the reference layer information included in the SEI by changing the threshold for the reference layer information corresponding to the selected pictures.

Only the fast-forward reproducing unit 110 of the reproducing device 2 has been described herein. However, another unit that performs another type of trick play such as rewind reproducing of the video stream in the reproducing device 2 is similar to the fast-forward reproducing unit 110, for example, except for outputting the pictures to the display device 3 in a different order.

For example, a rewind reproducing unit that rewind reproduces the video selects and decodes the pictures to be rewind reproduced in accordance with the reference layer information, similarly to the fast-forward reproducing unit 110, and then outputs the decoded pictures in order of display in reverse order.

In the first embodiment, the reproducing device 2 performs trick play in accordance with the reference layer information. However, the reproducing device 2 may reproduce the video at a frame rate lower than the frame rate of the video stream recorded on the optical disk 11. In the reproduction at the lower frame rate, the reproducing device 2 may decode the pictures selected in accordance with the reference layer information at the same time as the time at which all of the pictures are decoded. This reduces the processing load on the reproducing device 2, and thus enables a reproducing device 2 having low capacity to decode the pictures.

In the first embodiment, the first picture is necessarily reproduced. However, when the reference layer information of the first picture is larger than the threshold, the first picture is not necessarily reproduced.

Second Embodiment (Description of Computer Using Present Invention)

The sequence of processes described above can be implemented with either hardware or software. When the sequence of processes is implemented with software, the program including the software is installed on the computer. The computer in this example is a computer incorporated in dedicated hardware, or a computer, such as a general-purpose personal computer, capable of performing various functions by installing various programs.

FIG. 15 is a block diagram of an exemplary configuration of the hardware of the computer performing the sequence of process described above using programs.

In a computer 200, a Central Processing Unit (CPU) 201, a Read Only Memory (ROM) 202, and a Random Access Memory (RAM) 203 are connected to each other via a bus 204.

An input/output interface 205 is also connected to the bus 204. An input unit 206, an output unit 207, a storage unit 208, a communication unit 209, and a drive 210 are also connected to the input/output interface 205.

The input unit 206 includes, for example, a keyboard, a mouse, or a microphone. The output unit 207 includes, for example, a display, or a loudspeaker. The storage unit 208 includes, for example, a hard disk or a non-volatile memory. The communication unit 209 includes, for example, a network interface. The drive 210 drives a removable medium 211 such as a magnetic disk, an optical disk, a magneto-optical disk, or a semiconductor memory.

In the computer 200 having the configuration described above, the CPU 201 loads and executes the program, for example, stored in the storage unit 208 on the RAM 203 via the input/output interface 205 and the bus 204.

The program executed by the computer 200 (CPU 201) is available after being recorded on the removable medium 211 used, for example, as a package medium. The program is available via a wired or wireless transmission medium such as a local area network, the Internet, or digital satellite broadcast.

In the computer 200, the program can be installed on the storage unit 208 via the input/output interface 205 when the removable medium 211 is attached to the drive 210. Alternatively, the program can be installed on the storage unit 208 after the communication unit 209 receives the program via the wired or wireless transmission medium. Alternatively, the program can previously be installed on the ROM 202 or the storage unit 208.

Note that the program executed by the computer 200 can be a program in which the processes are chronologically performed in the order described herein, or can be a program in which the processes are performed in parallel or performed when required, for example, when the program is invoked.

Herein, the example in which the reference layer information is multiplexed as the encoded data, and transmitted from the encoding end to the decoding end has been described. However, the method for transmitting the reference layer information is not limited to the example. For example, the reference layer information may be transmitted to or recorded on the decoding end as data different from and related to the encoded data without being multiplexed as the encoded data. The term "related to" herein means that a picture (or a part of a picture such as a slice or a block) included in the video stream can be linked to the information corresponding to the picture when the picture is decoded. In other words, the reference layer information may be recorded on a recording medium different from the recording medium on which the encoded data is recorded (or may be recorded on a different area in the same recording medium). Alternatively, the reference layer information may be linked to the encoded data, for example, in an arbitrary unit, for example, in a unit of pictures, in a unit of a picture, or in a unit of a part of a picture.

The system herein means a set of a plurality of components (for example, devices, or modules (parts)). Thus, it does not matter if all of the components are included in a casing. Accordingly, either of a plurality of devices stored in different casings and connected via a network, or a device including a plurality of modules in a casing is a system.

Furthermore, the effects described herein are merely examples. The effects of the present invention are not limited to the described effects, and may include another effect.

The embodiments of the present invention are also not limited to the embodiments described above, and can variously be changed without departing from the gist of the present invention.

For example, the contents can be provided also via a broadcast wave or a network. In this example, the present invention can be used, for example, for a set-top box or television receiver that receives a broadcast wave, or a personal computer that transmits and receives data via a network.

Alternatively, for example, the reference layer information may be included in information stored in SEI other than the GOP structure map. The reference layer information may be stored in the SEI of a picture other than the first picture, or in the parameter set other than SEI.

Furthermore, the present invention can have a configuration, for example, as cloud computing in which a plurality of devices share a function via a network to cooperate in the process.

Each step described in the explanatory flowcharts can be performed by a device or shared and performed by a plurality of devices.

Furthermore, when a step includes a plurality of processes, the processes in the step can be performed by a device or shared and performed by a plurality of devices.

The present invention can have the following configuration.

(1) An image processing apparatus including:
a setting unit that sets additional information about encoded data of pictures, the additional information including reference layer information indicating layers of a reference relationship among the pictures.

(2) The image processing apparatus according to (1), wherein
the additional information includes the reference layer information about all pictures of a Group of Picture (GOP) including the pictures.

(3) The image processing apparatus according to (2), wherein
the additional information is additional information about encoded data of a first picture of the GOP.

(4) The image processing apparatus according to any of (1) to (3), wherein
the additional information includes picture type information indicating a type of the picture.

(5) The image processing apparatus according to any of (1) to (4), wherein
the pictures are encoded in a High Efficiency Video Coding (HEVC) scheme, and
the additional information is Supplemental Enhancement Information (SEI).

(6) An image processing method including:
setting, with an image processing apparatus, additional information about encoded data of pictures, the additional information including reference layer information indicating layers of a reference relationship among the pictures.

(7) A program causing a computer to function as
a setting unit that sets additional information about encoded data of pictures, the additional information including reference layer information indicating layers of a reference relationship among the pictures.

(8) An image processing apparatus including:
a selection unit that selects a picture to be reproduced in accordance with reference layer information indicating layers of a reference relationship among pictures, the reference layer information being included in additional information about encoded data of the pictures.

(9) The image processing apparatus according to (8), wherein
the additional information includes reference layer information about all pictures of a Group of Picture (GOP) including the pictures.

(10) The image processing apparatus according to (9), wherein
the additional information is additional information about encoded data of a first picture of the GOP.

(11) The image processing apparatus according to any of (8) to (10), wherein
the additional information includes picture type information indicating a type of the picture.

(12) The image processing apparatus according to any of (8) to (11), wherein
the pictures are encoded in a High Efficiency Video Coding (HEVC) scheme, and
the additional information is Supplemental Enhancement Information (SEI).

(13) The image processing apparatus according to any of (8) to (12), further including:
a decoder that decodes encoded data of the picture to be reproduced, the picture to be reproduced being selected by the selection unit.

(14) An image processing method including:
selecting, with an image processing apparatus, a picture to be reproduced in accordance with reference layer information indicating layers of a reference relationship among pictures, the reference layer information being included in additional information about encoded data of the pictures.

(15) A program causing a computer to function as
a selection unit that selects a picture to be reproduced in accordance with reference layer information indicating layers of a reference relationship among pictures, the reference layer information being included in additional information about encoded data of the pictures.

(16) A recording medium being attached to an information processing apparatus and reproduced, on which an encoded stream including additional information about encoded data of pictures and the encoded data is recorded, the additional information including reference layer information indicating layers of a reference relationship among the pictures,
the recording medium causing an information processing apparatus acquiring the encoded stream to select a picture to be reproduced in accordance with the reference layer information included in the additional information.

REFERENCE SIGNS LIST

1 Recording device
2 Reproducing device
11 Optical disk
51 Setting unit
114 Selection unit
115 Decoder

The invention claimed is:
1. An image processing apparatus, comprising:
at least one processor configured to:
generate a parameter set that comprises Supplemental Enhancement Information (SEI) of an Elementary Stream (ES) of encoded data of a plurality of pictures, wherein
the SEI comprises reference layer information that indicates a plurality of layers of a reference relationship among the plurality of pictures,
the reference relationship indicates that a first picture of the plurality of pictures refers to at least one second picture of the plurality of pictures,
the SEI is recorded in a format complying with a Blu-ray Disc (BD) standard, and
a set of pictures, of the plurality of pictures, having the reference layer information less than or equal to a threshold is selected for decoding at a reproducing device.

2. The image processing apparatus according to claim 1, wherein the SEI further comprises the reference layer information associated with the plurality of pictures of a Group of Picture (GOP), and wherein the GOP comprises the plurality of pictures.

3. The image processing apparatus according to claim 2, wherein the SEI further comprises information associated with the encoded data of the first picture of the GOP.

4. The image processing apparatus according to claim 1, wherein the SEI further comprises picture type information that indicates a type of the plurality of pictures.

5. The image processing apparatus according to claim 1, wherein the plurality of pictures are encoded in a High Efficiency Video Coding (HEVC) scheme.

6. An image processing method, comprising:
in an information processing apparatus,
generating a parameter set comprising Supplemental Enhancement Information (SEI) of an Elementary Stream (ES) of encoded data of a plurality of pictures, wherein
the SEI comprises reference layer information indicating a plurality of layers of a reference relationship among the plurality of pictures,
the reference relationship indicates that a first picture of the plurality of pictures refers to at least one second picture of the plurality of pictures,
the SEI is recorded in a format complying with a Blu-ray Disc (BD) standard, and
a set of pictures, of the plurality of pictures, having the reference layer information less than or equal to a threshold is selected for decoding at a reproducing device.

7. A non-transitory computer-readable medium having stored thereon, computer-executable instructions, which when executed by a computer, cause the computer to perform operations, the operations comprising:
generating a parameter set including Supplemental Enhancement Information (SEI) of an Elementary Stream (ES) of encoded data of a plurality of pictures, wherein
the SEI comprises reference layer information indicating a plurality of layers of a reference relationship among the plurality of pictures,
the reference relationship indicates that a first picture of the plurality of pictures refers to at least one second picture of the plurality of pictures,
the SEI is recorded in a format complying with a Blu-ray Disc (BD) standard, and
a set of pictures, of the plurality of pictures, having the reference layer information less than or equal to a threshold is selected for decoding at a reproducing device.

8. An image processing apparatus, comprising:
at least one processor configured to:
select a set of pictures from a plurality of pictures based on reference layer information that indicates a plurality of layers of a reference relationship among the plurality of pictures, wherein
the reference layer information is included in Supplemental Enhancement Information (SEI) of an Elementary Stream (ES) of encoded data of the plurality of pictures,
the reference relationship indicates that a first picture of the plurality of pictures refers to at least one second picture of the plurality of pictures, and
the SEI is recorded in a format complying with a Blu-ray Disc (BD) standard; and
decode the set of pictures, of the plurality of pictures, having the reference layer information less than or equal to a threshold.

9. The image processing apparatus according to claim 8, wherein the SEI further comprises reference layer information associated with the plurality of pictures of a Group of Picture (GOP), and wherein the GOP comprises the plurality of pictures.

10. The image processing apparatus according to claim 9, wherein the SEI is additional information associated with the encoded data of the first picture of the GOP.

11. The image processing apparatus according to claim 8, wherein the SEI further comprises picture type information that indicates a type of the plurality of pictures.

12. The image processing apparatus according to claim 8, wherein the plurality of pictures are encoded in a High Efficiency Video Coding (HEVC) scheme.

13. The image processing apparatus according to claim 8, further comprising a decoder configured to decode the encoded data of the first set of pictures.

14. An image processing method, comprising:
in an image processing apparatus:
selecting a set of pictures from a plurality of pictures based on reference layer information indicating a plurality of layers of a reference relationship among the plurality of pictures, wherein
the reference layer information is included in a parameter set including Supplemental Enhancement Information (SEI) of an Elementary Stream (ES) of encoded data of the plurality of pictures,
the reference relationship indicates that a first picture of the plurality of pictures refers to at least one second picture of the plurality of pictures, and
the SEI is recorded in a format complying with a Blu-ray Disc (BD) standard; and
decoding the set of pictures, of the plurality of pictures, having the reference layer information less than or equal to a threshold.

15. A non-transitory computer-readable medium having stored thereon, computer-executable instructions, which when executed by a computer, cause the computer to perform operations, the operations comprising:
selecting a set of pictures from a plurality of pictures based on reference layer information indicating a plurality of layers of a reference relationship among the plurality of pictures, wherein
the reference layer information is included in a parameter set comprising Supplemental Enhancement Information (SEI) of an Elementary Stream (ES) of encoded data of the plurality of pictures,
the reference relationship indicates that a first picture of the plurality of pictures refers to at least one second picture of the plurality of pictures, and
the SEI is recorded in a format complying with a Blu-ray Disc (BD) standard; and
decoding the set of pictures, of the plurality of pictures, having the reference layer information less than or equal to a threshold.

16. A non-transitory computer-readable medium having stored thereon, computer-executable instructions, which when executed by a computer, cause the computer to perform operations, the operations comprising:
acquiring an encoded stream comprising a plurality of pictures; and
selecting a set of pictures from the plurality of pictures based on reference layer information included in a parameter set comprising Supplemental Enhancement Information (SEI) of an Elementary Stream (ES) of encoded data of the plurality of pictures, wherein
the encoded stream comprises the SEI associated with the encoded data of the plurality of pictures,
the SEI is recorded in a format complying with a Blu-ray Disc (BD) standard,
the SEI comprises the reference layer information indicating layers of a reference relationship among the plurality of pictures, and
the reference relationship indicates that a first picture of the plurality of pictures refers to at least one second picture of the plurality of pictures; and
decoding the set of pictures, of the plurality of pictures, having the reference layer information less than or equal to a threshold.

17. The image processing apparatus according to claim 8, wherein the at least one processor is further configured to change the threshold to control granularity of trick play during reproduction.

* * * * *